United States Patent
Kamei et al.

[11] Patent Number: 6,056,372
[45] Date of Patent: May 2, 2000

[54] VEHICLE BRAKING SYSTEM ADAPTED TO DUTY-CONTROL SOLENOID VALVE DEVICE TO CONTROL WHEEL BRAKE CYLINDER PRESSURE

[75] Inventors: Shoichi Kamei; Hisakatsu Chuma, both of Toyota; Shoji Ito, Susono, all of Japan

[73] Assignee: Toyota Jidosha Kabushiki Kaisha, Toyota, Japan

[21] Appl. No.: 08/841,010

[22] Filed: Apr. 29, 1997

[30] Foreign Application Priority Data

Apr. 30, 1996 [JP] Japan .................................. 8-109028

[51] Int. Cl.⁷ ...................................................... B60T 8/40
[52] U.S. Cl. ..................... 303/155; 303/171; 303/DIG. 8
[58] Field of Search ..................... 303/156, 155, 303/DIG. 8, 157, 158, 171

[56] References Cited

U.S. PATENT DOCUMENTS 4,865,399  9/1989  Atkins et al. ....................... 303/DIG. 8
5,538,334  7/1996  Kushi et al. .......................... 303/113.5

FOREIGN PATENT DOCUMENTS 7251727A  10/1995  Japan .

*Primary Examiner*—Matthew C. Graham
*Attorney, Agent, or Firm*—Kenyon & Kenyon

[57] ABSTRACT

A braking device of diagonal type having two sub-systems each including a front wheel brake cylinder and a rear wheel brake cylinder which are connected to master cylinder through respective front and rear passages in which are first and second solenoid-operated valves are disposed. The rear passage is connected to a portion of the front passage between the first valve and the front wheel brake cylinder, and a third solenoid-operated valve is disposed in a reservoir passage connecting the rear passage to a reservoir connected to a pump. A controller for controlling the valves and the pump includes a device for alternately opening and closing the third valve in a predetermined switching pattern while the second valve is held open or is alternately opened and closed, whereby the rate of change of the braking pressure in each wheel brake cylinder can be controlled as desired depending upon the switching pattern of the third valve.

11 Claims, 26 Drawing Sheets

(ANTI-LOCK BRAKING PRESSURE CONTROL ROUTINE)

(STEP S2 OF FIG. 4)

(STEP S3 OF FIG. 4)

FIG. 7

WHERE BRAKE FLUID IS STORED IN RESERVOIR 36

| CONTROL MODE FRONT/REAR | REAR WHEEL | | | |
|---|---|---|---|---|
| SOLENOID VALVE CONTROL STATE NO. | DURING NORMAL BRAKING | SLIP INCREASING TENDENCY (EXCESSIVE SLIP) | SLIP DECREASING TENDENCY | AFTER SLIP DECREASE |
| FRONT WHEEL — DURING NORMAL BRAKING | M INC. /M INC.<br>NO. 1 | M INC. /DEC.<br>NO. 3 | M INC. /HLD<br>NO. 2 | M INC. /S INC.<br>NO. 1 ↓ NO. 2 |
| SLIP INCREASING TENDENCY (EXCESSIVE SLIP) | DEC. /DEC.<br>NO. 7 | DEC. /DEC.<br>NO. 7 | DEC. /DEC.<br>NO. 7 | DEC. /DEC.<br>NO. 7 |
| SLIP DECREASING TENDENCY | HLD/P INC.<br>NO. 6 | HLD/DEC.<br>NO. 4 ↓ NO. 7 ↓ NO. 4 ↓ NO. 7 | HLD/HLD<br>NO. 4 ↓ NO. 7 ↓ NO. 4 ↓ NO. 6 | HLD/P INC.<br>NO. 6 |
| AFTER SLIP DECREASE | S INC. /S INC.<br>NO. 6 ↓ NO. 4 | P INC. /DEC.<br>NO. 5 | P INC. /HLD<br>NO. 4 | S INC. /S INC.<br>NO. 6 ↓ NO. 4 |

FIG. 8

WHERE RESERVOIR 36 IS EMPTY

| CONTROL MODE FRONT/REAR | | REAR WHEEL | | | |
|---|---|---|---|---|---|
| SOLENOID VALVE CONTROL STATE NO. | | DURING NORMAL BRAKING | SLIP INCREASING TENDENCY (EXCESSIVE SLIP) | SLIP DECREASING TENDENCY | AFTER SLIP DECREASE |
| FRONT WHEEL | DURING NORMAL BRAKING | M INC. /M INC.<br>NO. 1 | M INC. /DEC.<br>NO. 3 | M INC. /HLD<br>NO. 2 | M INC. /S INC.<br>NO. 1<br>↓<br>NO. 2 |
| | SLIP INCREASING TENDENCY (EXCESSIVE SLIP) | DEC. /DEC.<br>NO. 7 | DEC. /DEC.<br>NO. 7 | DEC. /DEC.<br>NO. 7 | DEC. /DEC.<br>NO. 7 |
| | SLIP DECREASING TENDENCY | HLD/P INC.<br>NO. 6 | HLD/DEC.<br>NO. 4<br>↓<br>NO. 7<br>↓<br>NO. 4<br>↓<br>NO. 7 | HLD/HLD<br>NO. 4<br>↓<br>NO. 7<br>↓<br>NO. 4<br>↓<br>NO. 6 | HLD/P INC.<br>NO. 6 |
| | AFTER SLIP DECREASE | S INC. /S INC.<br>NO. 1<br>↓<br>NO. 6<br>↓<br>NO. 2<br>↓<br>NO. 4 | M INC. /DEC.<br>NO. 3<br>↓<br>NO. 5 | M INC. /HLD<br>NO. 2<br>↓<br>NO. 4 | S INC. /S INC.<br>NO. 1<br>↓<br>NO. 6<br>↓<br>NO. 2<br>↓<br>NO. 4 |

FIG. 9

| No. | FIRST SHUT-OFF VALVE DEVICE | SECOND SHUT-OFF VALVE DEVICE | THIRD SHUT-OFF VALVE DEVICE | Fr | Rr |
|---|---|---|---|---|---|
| 1 | O | O | X | M/C INCREASE | M/C INCREASE |
| 2 | O | X | X | M/C INCREASE | HOLD |
| 3 | O | X | O | M/C INCREASE | DECREASE |
| 4 | X | X | X | PUMP INCREASE | HOLD |
| 5 | X | X | O | PUMP INCREASE | DECREASE |
| 6 | X | O | X | HOLD | PUMP INCREASE |
| 7 | X | O | O | DECREASE | DECREASE |
| 8 | O | O | O | — | — |

O : OPEN   X : CLOSED (LOW FRICTION COEFFICIENT BRAKING PRESSURE CONTROL)

(SETTING OF "ENABLE" FLAG)

(DETERMINATION OF PRESSURE DECREASE OSCILLATION)

VEHICLE BRAKING SYSTEM ADAPTED TO DUTY-CONTROL SOLENOID VALVE DEVICE TO CONTROL WHEEL BRAKE CYLINDER PRESSURE

This application is based on Japanese Patent Application No. 8-109028 filed Apr. 30, 1996, the content of which is incorporated hereinto by reference.

CROSS REFERENCE TO RELATED APPLICATIONS

Not Applicable

BACKGROUND OF THE INVENTION

1. Field of the Invention

The present invention relates in general to a motor vehicle braking system of diagonal or X-crossing type having two pressure application sub-systems each including three solenoid-operated valve devices which are electrically controlled to regulate braking pressures in front and rear wheel brake cylinders. More particularly, the present invention is concerned with improvements in techniques for controlling such solenoid-operated valve devices.

2. Discussion of the Related Art

The assignee of the present invention developed a braking system of diagonal type for a motor vehicle, wherein each of two pressure application sub-systems includes three solenoid-operated valve devices electrically controlled to regulate braking pressures in a front wheel brake cylinder and a rear wheel brake cylinder. This braking system was developed in an effort to reduce the required number of the solenoid-operated valve devices for controlling the braking pressures for the four wheels of the motor vehicle.

The braking system developed by the assignee is disclosed in U.S. Pat. No. 5,538,334 to Kushi et al. corresponding to JP-A-223529, which is a laid-open publication of unexamined Japanese Patent Application filed in the name of the assignee. The arrangement of this braking system will be briefly described referring to FIG. 29.

This braking system is designed for use on a four-wheel motor vehicle having front right and left wheels and rear right and left wheels. The braking system has two pressure application sub-systems connected to respective two mutually independent fluid pressurizing chambers of a master cylinder 200. One of the sub-system includes a brake cylinder for braking a front right wheel and a brake cylinder for braking a rear left wheel, and the other sub-system includes a brake cylinder for braking a front left wheel and a brake cylinder for braking a rear right wheel. Thus, the braking system is referred to as "diagonal" or "X-crossing" type in the present application. The two pressure application sub-systems are identical in construction with each other. One of these sub-systems is shown in FIG. 29.

In each pressure application sub-system, the corresponding pressurizing chamber of the master cylinder 200 is connected through a front brake cylinder passage 204 to a front wheel brake cylinder 202 for the front wheel Fr. A rear brake cylinder passage 206 is connected at one end thereto to the front brake cylinder passage 204 and at the other end to a brake cylinder 208 for the rear wheel brake cylinder 208. A normally open first solenoid-operated valve device 212 having an open state and a closed state is disposed in a portion of the front brake cylinder passage 204 between the master cylinder 200 and a point of connection between the front and rear brake cylinder passages 204, 206. A normally open second solenoid-operated valve device 214 also having an open state and a closed state is disposed in the rear brake cylinder passage 207. A reservoir passage 218 is connected at one end thereto to a reservoir 216 and at the other end to a portion of the rear wheel brake cylinder 206 between the second solenoid-operated valve device 214 and the rear wheel brake cylinder 208. A third solenoid-operated valve device 220 having an open state and a closed state is disposed in the reservoir passage 218. A pump passage 224 is connected at one end thereof to the reservoir 216 and at the other end to a portion of the rear brake cylinder passage 206 between the second solenoid-operated valve device 214 and the point of connection of the front and rear brake cylinder passages 204, 206. However, the pump passage 224 may be connected to a portion of the front brake cylinder passage 204 between the first solenoid-operated valve device 212 and the front wheel brake cylinder 202. A pump 222 is disposed in the pump passage 224, for pressurizing a fluid received from the reservoir 216.

The braking system includes a controller 226 which is adapted to selected one of a plurality of pressure control modes for each wheel brake cylinder, on the basis of the slipping condition of the corresponding wheel. The pressure control modes includes a pressure decrease mode, a pressure increase mode and a pressure hold mode in which the braking pressure in the wheel brake cylinder is decreased, increased and held constant (raised, reduced and maintained), respectively. In an anti-lock braking pressure control operation, the controller 226 activates an electric motor 228 for driving the pump 22, and suitably controls the solenoid-operated valve devices 212, 214, 220, to regulate the braking pressures in the wheel brake cylinder 202, 208 of each pressure application sub-system, so as to prevent an excessive amount of slip of each wheel during braking of the vehicle.

In this braking system, the pressure increase mode includes a pump increase mode and a master cylinder increase mode. The pump increase mode is available when a sufficient amount of brake fluid is stored in the reservoir 216, while the master cylinder increase mode is available when the amount of the brake fluid stored in the reservoir 216 is not sufficient. In the pump increase mode, the controller 226 closes the first solenoid-operated valve device 212, and activates the motor 228 to operate the pump 222, so that the braking pressures in the front and rear wheel brake cylinders 202, 208 are increased by the pressurized fluid delivered from the pump 222. In the master cylinder increase mode, the controller 226 places the first solenoid-operated valve 212 in the open state, so that the braking pressures in the wheel brake cylinders 202, 208 are increased by the pressurized fluid delivered from the master cylinder 200.

In this braking system wherein each pressure application sub-system uses the three solenoid-operated valve devices 212, 214, 220, the total number of the solenoid-operated valves required for controlling the braking pressures in the four wheel brake cylinders of the vehicle is as small as six. Another advantage of this braking system is derived from the arrangement in which the fluid stored in the reservoir 216 is pressurized by the pump 222, and the pressurized fluid is returned to the portions of the front and rear brake cylinder passages 204, 206 which are isolated from the master cylinder 200 by the first solenoid-operated valve device 212 placed in the closed state. In other words, the fluid in the reservoir 216 need not be returned to the master cylinder 200 whose pressure is higher than the pressure in the above-indicated portions of the front and rear brake cylinder passage 204, 206 which are located downstream of the closed first solenoid-operated valve device 212. Accordingly, the required delivery pressure of the pump 222 need not be equal to or higher than the pressure of the master cylinder 200, whereby the required capacities of the pump 222 and the motor 228 can be significantly reduced.

On the other hand, however, the braking system described above suffers from a problem that it is difficult to control, as needed, the rate of change of the braking pressure in each wheel brake cylinder.

In each pressure application sub-system using the three solenoid-operated valve devices, there are only eight combinations of the operating states (open and closed states) of the solenoid-operated valve devices, as indicated in the table of FIG. 9. Accordingly, there are only eight combinations of the pressure control modes for the front and rear wheel brake cylinders. Each combination of the operating states of the solenoid-operated valve devices will be referred to as a control state of the valve devices. That is, there are a total of eight control states Nos. 1–8 of the valve devices.

Described in detail, the combinations of the open and closed states of the three solenoid-operated valve devices do not permit a sufficiently large number of pressure control modes, which include, for instance, a hold-hold mode for the front and rear wheel brake cylinders, a slow front pressure decrease mode for the front wheel brake cylinder, and a slow rear pressure decrease mode for the rear wheel brake cylinder. In the hold-hold mode, the pressure hold mode is selected for both of the front and rear wheel brake cylinders. In the slow front pressure decrease mode, the braking pressure in the front wheel brake cylinder is reduced at a lower rate than in the pressure decrease mode established in the control state No. 7 indicated in the table of FIG. 9. In the slow rear pressure decrease mode, the braking pressure in the rear wheel brake cylinder is reduced at a lower rate than in the pressure decrease mode established in the control states Nos. 3, 5 and 7 also indicated in the table of FIG. 9.

The combinations of the operating states of the three solenoid-operated valve devices indicated in the table of FIG. 9 includes the combination established in the control state No. 6, which is provided to establish the pressure hold mode for the front wheel brake cylinder 202. Actually, however, the braking pressure in the front wheel brake cylinder is slowly increased, when the first and third solenoid operated valve devices 212, 220 are closed while the second solenoid-operated valve device 214 is open. That is, the braking system does not include a solenoid-operated valve device for disconnecting the front wheel brake cylinder 202 from the pump 222. In the pressure hold mode for the front wheel brake cylinder 202, the second solenoid-operated valve device 214 is open to permit the pressurized fluid to be delivered from the pump 222 to the rear wheel brake cylinder 208 through the open valve device 214, as well as to the front wheel brake cylinder 204. Generally, the volume of the rear wheel brake cylinder 208 is smaller than that of the front wheel brake cylinder 202. When the pressure hold mode is established for the front wheel brake cylinder 202, therefore, the braking pressure in the rear wheel brake cylinder 208 is increased at a relatively high rate, while the braking pressure in the front wheel brake cylinder 202 is increased at a relatively low rate.

While the conventional braking system illustrated in FIG. 9 has the advantages described above, it has a drawback that it is difficult to control the rate of change of the braking pressure of each wheel brake cylinder as needed or desired.

SUMMARY OF THE INVENTION

It is therefore an object of the present invention to provide a braking system of a motor vehicle, which provides an improved freedom in controlling the braking pressure in a wheel brake cylinder, particularly when the second solenoid-operated valve device is open.

The above object may be achieved according to a first aspect of this invention, which provides a braking system of diagonal type of a motor vehicle having front right and left wheels and rear right and left wheels, the braking system having two pressure application sub-systems connected to respective two mutually independent pressurizing chambers of a master cylinder, one of the two sub-systems including a front right wheel brake cylinder for braking the front right wheel and a rear left wheel brake cylinder for braking the rear left wheel, while the other of the two sub-systems including a front left wheel brake cylinder for braking the front left wheel and a rear right wheel brake cylinder for braking the rear right wheel, each of the two sub-systems further including a front brake cylinder passage connecting the master cylinder and the front wheel brake cylinder, a rear brake cylinder passage connecting the front brake cylinder passage and the rear wheel brake cylinder, a first solenoid-operated valve device disposed in a portion of the front brake cylinder passage between the master cylinder and a point of connection between the front and rear brake cylinder passages, a second solenoid-operated valve device disposed in the rear brake cylinder passage and having an open and a closed state, a reservoir passage connected at one end thereto to a portion of the rear brake cylinder passage between the second solenoid-operated valve device and the rear wheel brake cylinder, a reservoir connected to the other end of the reservoir passage, a third solenoid-operated valve device disposed in the reservoir passage and having an open and a closed state, a pump passage connected at one end thereto to the reservoir and at the other end to a portion of the front brake cylinder passage between the first solenoid-operated valve device and the front wheel brake cylinder or a portion of the rear brake cylinder passage between the second solenoid-operated valve device and the point of connection, a pump disposed in the pump passage, for pressurizing a fluid received from the reservoir, and a controller for controlling the first, second and third solenoid-operated valve devices and the pump of the each sub-system, to control a braking pressure in each of the front and rear wheel brake cylinders of each sub-system, and wherein the controller includes solenoid valve control means for alternately placing the third solenoid-operated valve device in the open and closed states in a predetermined switching pattern while at the same time holding the second solenoid-operated valve device in the open state or alternately placing said second solenoid-operated valve device in the open and closed states in a predetermined switching pattern.

In the present braking system, the rate of change in the braking pressure in each wheel brake cylinder is determined by a relationship between a rate of supply flow of the brake fluid from the pump into the wheel brake cylinder and a rate of discharge flow of the fluid from the wheel brake cylinder into the reservoir. The rate of the discharge flow from the wheel brake cylinder can be controlled by the duty ratio or cycle of the third solenoid-operated valve device, that is, an open time ratio of this valve device, which is a ratio of the open time to the close time of the third solenoid-operated valve device. The open time and the close time are time periods during which the third solenoid-operated valve device is placed in the open and closed states, respectively, while this valve device is alternately opened and closed. When the third solenoid-operated valve device is alternately opened and closed while the second solenoid-operated valve device is held open, the rate of supply flow of the fluid into the wheel brake cylinder can also be controlled. Therefore, the relationship between the rates of supply flow and discharge flow of the fluid into and from the wheel brake cylinder can be optimized by suitably determining the open time ratio of the third solenoid-operated valve device. Accordingly, the rate of change of the braking pressure in each wheel brake cylinder can be optimized by suitably determining the open time ratio.

In the braking system of the present invention developed in the light of the above finding, the third solenoid-operated valve device is alternately opened and closed while at the same time the second solenoid-operated valve device is held open or is alternately opened and closed. Thus, the present braking system provides a software solution to the hardware-related problem in the prior art that it is difficult to control the rate of change of the wheel braking pressure as desired. The software solution lies in that at least the third solenoid-operated valve device is alternately opened and closed in the predetermined switching pattern, so as to improve the freedom of control of the braking pressure in each wheel brake cylinder. If the second solenoid-operated valve device as well as the third solenoid-operated valve device is alternately opened and closed, the freedom of control of the braking pressure is further improved.

The present invention will be further explained to clarify its concept and principle.

(1) The requirement "for alternately placing the third solenoid-operated valve device in the open and closed states in a predetermined switching pattern" is not met even if the third solenoid-operated valve device is alternately opened and closed under a specific braking condition of the vehicle. The solenoid valve control means provided according to the present invention is adapted to positively place the third solenoid-operated valve device alternately in the open and closed states in a predetermined opening and closing pattern.

(2) For instance, the "switching pattern" is determined by the period or frequency of the alternate opening and closing actions, and the time lengths (open and close times) during which the second or third valve device is placed in the open and closed states, respectively, or the ratio of the open time to the close time. The "predetermined switching pattern" is not interpreted to mean that the switching pattern is fixed or remains unchanged. For example, the above-indicated period and/or the ratio of the open time to the close time may be changed depending upon a selected parameter or parameters (e.g., friction coefficient of the road surface), according to a predetermined rule. In this case, too, the switching pattern is considered to be "predetermined".

(3) Where the solenoid valve control means is adapted to alternately open and close the third solenoid-operated valve device while the second solenoid-operated valve device is also alternately opened and closed, the second solenoid-operated valve device should be a solenoid-operated shut-off valve device. Where the solenoid valve control means is adapted to alternately open and close the third solenoid-operated valve device while the second solenoid-operated valve device is held open, the second valve device may be a solenoid-operated directional control valve or other type of solenoid-operated valve device. The first solenoid-operated valve device may be a shut-off valve device or other type of solenoid-operated valve device.

(4) The principle of the present invention is applicable not only to a braking system arranged to control a braking pressure of a wheel brake cylinder in an anti-lock fashion during braking of a motor vehicle, but also to any braking system arranged for controlling the wheel braking pressure for any other purposes, for example, for controlling traction or drive forces of drive wheels so as to prevent excessive amounts of slip of the drive wheels during starting of the vehicle, in particular. The present braking system having the solenoid valve control means described above may be operated to control the amounts of slip, braking forces, drive forces and lateral forces of the wheels of the vehicle.

(5) According to the present invention, the controller may be adapted to hold the first solenoid-operated valve device in the closed state and operate the pump so as to increase the wheel braking pressure in an anti-lock braking operation, while a sufficient amount of brake fluid is stored in the reservoir. In this case, the first valve device is opened to increase the wheel braking pressure by the pressure of the master cylinder while the amount of the brake fluid stored in the reservoir is not sufficient. According to this arrangement, the delivery pressure of the pump need not be equal to or higher than the pressure generated by the master cylinder, when the wheel braking pressure is increased by the pump. Accordingly, the required delivery capacity of the pump is reduced, and the cost and size of the pump and a motor for driving the pump can be easily reduced. The controller may be adapted such that the wheel braking pressure during an anti-lock braking operation is always increased by operation of the pump with the first valve device held closed, irrespective of whether the amount of the brake fluid in the reservoir is sufficient or not.

According to a first preferred form of this invention, the controller includes (a) control mode selecting means for selecting one of a plurality of pressure control modes, for each of the front and rear wheel brake cylinders of the each sub-system, depending upon a slipping condition of the each wheel, the pressure control modes including a pressure decrease mode, a pressure increase mode and a pressure hold mode in which the braking pressure in the corresponding wheel brake cylinder is decreased, increased and held constant, respectively, and (b) solenoid valve control means for controlling the first, second and third solenoid-operated valve devices according to the pressure control mode selected for each wheel brake cylinder. The solenoid valve control means includes a basic control portion for establishing the selected pressure control mode by holding each of the first, second and third solenoid-operated valve devices in a predetermined one of the open and closed states, and an auxiliary control portion for establishing the selected pressure control mode by placing each of at least one of the first, second and third solenoid-operated valve devices alternately in the open and closed states. The auxiliary control portion comprises the solenoid valve control means described above.

In the above first preferred form of the invention, the controller includes not only the basic control portion, but also the auxiliary control portion which comprises the solenoid valve control means for alternately opening and closing at least the third solenoid-operated valve device, so that the freedom of control of the wheel braking pressure is further improved.

According to a second preferred form of the invention, the solenoid valve control means comprises open time changing means for changing a ratio of an open time during which the third solenoid-operated valve device is placed in the open position, to a close time during which the third solenoid-operated valve device is placed in the closed position, such that the above-indicated ratio (open time ratio) changes according to a change in a friction coefficient of a road surface on which the motor vehicle is running.

The rate of flow of the brake fluid from the wheel brake cylinder in -to the reservoir is changed by not only the open time ratio of the third valve device but also the level of the braking pressure in the wheel brake cylinder. Generally, the level of the braking pressure increases with an increase in the friction coefficient of the road surface. In view of this fact, the open time ratio of the third solenoid-operated valve device is changed with the friction coefficient of the road surface, whereby the braking pressure in the wheel brake cylinder is compensated for a change in the friction coefficient of the road surface, and is thus optimized even while the friction coefficient is changing.

In one advantageous aspect of the first preferred form of the invention including the solenoid valve opening and closing means, the controller is adapted to control the first, second and third solenoid-operated valve devices so as to control the braking pressure in each of the wheel brake cylinders in an anti-lock fashion so as to prevent an excessive amount of slip of the corresponding wheel during braking of the motor vehicle, and solenoid valve control means comprises front pseudo-hold control means for establishing a pseudo-hold mode for the front wheel brake cylinder when the pressure hold mode and the pressure decrease modes are selected by the control mode selecting means for the front and rear wheel brake cylinders, respectively. The pseudo-hold mode is established by alternately placing at least the third solenoid-operated valve device, so that the braking pressure in the front wheel brake cylinder is held constant in the pseudo-hold mode.

In the above arrangement, the braking pressure in the front wheel brake cylinder can be eventually held constant, without a solenoid-operated valve device for disconnecting or isolating the pump and the front wheel brake cylinder from each other. Accordingly, the freedom of control of the braking pressure for the front wheel brake cylinder is improved, and the amount of slip of the front wheel can be held in an optimum range even when the vehicle is braked on a road surface having a relatively low friction coefficient.

In the above advantageous arrangement of the present braking system according to the first preferred form of the invention described above, the front pseudo-hold means may be adapted to alternately place the second solenoid-operated valve device in a first predetermined switching pattern, and at the same time alternately place the third solenoid-operated valve device in a second predetermined switching pattern wherein drive pulses for intermittently opening the third solenoid-operated valve device have a period which is equal to those for intermittently opening the second solenoid-operated valve device.

The switching patterns of the second and third solenoid-operated valve devices will be described by reference to FIG. 10, in which No. 1 SOL and No. 2 SOL represent the second and third solenoid-operated valve devices.

Where the second and third valve devices are alternately opened and closed in the same switching pattern, that is, where the first and second switching patterns indicated above are the same, the braking pressure in the front wheel brake cylinder Fr is alternately increased and decreased. Further, the brake fluid which has been delivered from the pump to the front wheel brake cylinder Fr is discharged into the reservoir through the second and third solenoid-operated valve devices. Accordingly, the braking pressure in the front wheel brake cylinder is eventually held constant. In the above arrangement wherein the first and second solenoid-operated valve devices are both alternately opened and closed, it is desirable that the period of the drive pulses for opening the third valve device be equal to that of the drive pulses for the second valve device, so that the braking pressure in the front wheel brake cylinder can be suitably held constant.

The drive pulses for intermittently opening the the second and third solenoid-operated valve devices will be further explained.

(1) The trains of the drive pulses for intermittently opening the valve devices, namely, for alternately opening and closing the valve devices are defined by the period and the pulse width. However, the pulse width is a factor that must be determined depending upon the relationship between the resistances of flow of the brake fluid through the front and rear brake cylinder passages. For optimizing the braking pressure in the front wheel brake cylinder in the pseudo-hold mode, it is not considered essential that the pulse width of the drive pulses for the third valve device be equal to that of the drive pulses for the second valve device.

(2) In the two patterns of the drive pulse trains as shown in FIG. 10, for the second and third solenoid-operated valve devices, the pulse width and period do not change as a function of time. That is, the drive pulse trains have a constant pulse width and a constant period. However, the width of each drive pulse and the period of the drive pulses may change as a function of time.

(3) While the drive pulse trains of FIG. 10 for the second and third solenoid-operated valve devices have the same pulse width, these two drive pulse trains may have different pulse widths.

(4) While the two drive pulse trains of FIG. 10 have the same phase, the synchronization of the drive pulses between the two pulse trains is not essential. That is, the drive pulses for opening the third valve device need not be synchronized with those for opening the second valve device. Actually, the second and third valve devices may have different operating response characteristics, which may cause asynchronous opening and closing actions of the two valve devices.

In a second advantageous arrangement of the first preferred form of the invention, the controller controls the first, second and third solenoid-operated valve devices so as to control the braking pressure in each of the wheel brake cylinders in an anti-lock fashion so as to prevent an excessive amount of slip of the corresponding wheel during braking of the motor vehicle, and the solenoid valve control means comprises front and rear pseudo-hold means for establishing a pseudo-hold mode for the front and rear wheel brake cylinders the said pressure hold mode is selected by said control mode selecting means (104) for the front and rear wheel brake cylinders. The pseudo-hold mode is established by alternately placing at least the third solenoid-operated valve device, so that the braking pressures in the front and rear wheel brake cylinders are held constant in said pseudo-hold mode.

In the above arrangement, the braking pressure in both of the front and rear wheel brake cylinders can be eventually held constant, without a solenoid-operated valve device for disconnecting or isolating the pump and the front wheel brake cylinder from each other. Accordingly, the freedom of control of the braking pressures for the front and rear wheel brake cylinders is improved, and the amount of slip of the rear wheel as well as the amount of slip of the front wheel can be held in an optimum range even when the vehicle is braked on a road surface having a relatively low friction coefficient.

In the above second advantageous arrangement of the first preferred form of the invention, the front and rear pseudo-hold means is preferably adapted to alternately place the second solenoid-operated valve device in a first predetermined switching pattern, and at the same time alternately place the third solenoid-operated valve device in a second predetermined switching pattern wherein an open time during which the third solenoid-operated valve device is placed in the open state is shorter than an open time during which the second solenoid-operated valve device is placed in the open state.

Where the first and second switching patterns for alternately opening and closing the second and third solenoid-operated valve devices are the same, the braking pressure in the rear wheel brake cylinder Rr indicated in FIG. 10 is alternately decreased and increased, as shown in FIG. 10, so that the braking pressure in the rear wheel brake cylinder is eventually decreased slowly at a relatively low rate. Where the open time ratio of the third valve device is lower than that of the second valve device, the rate of decrease in the braking pressure in the rear wheel brake cylinder is reduced. Further, the braking pressure in the front wheel brake cylinder has a lower response to a change in the open time ratio of the third solenoid-operated valve device than the braking pressure in the rear wheel brake cylinder, since the volume of the front wheel brake cylinder is generally larger than that of the rear wheel brake cylinder. Therefore, slight reduction of the open time ratio of the third valve device with respect to the open time ratio of the second valve device will not provide an appreciable change in the braking pressure in the front wheel brake cylinder. In view of this finding, the front and rear pseudo-hold means is preferably adapted to alternately open and close the second solenoid-operated valve device, and also alternately open and close the third solenoid-operated valve device such that the open time ratio of the third valve device is shorter than that of the second valve device.

In the above preferred arrangement of the front and rear pseudo-hold means, drive pulses for intermittently opening the third solenoid-operated valve device desirably have a period which is two times that of drive pulses for intermittently opening the second solenoid-operated valve device.

In the specific example of FIG. 12, the drive pulse train for the third solenoid-operated valve device (No. 3 SOL) is obtained by eliminating every other drive pulse of the drive pulse train for the second solenoid-operated valve device (No. 2 SOL). The drive pulse train for the third valve device has the same pulse width as the drive pulse train for the second valve device. However, the period of the drive pulses for the third valve device is two times that of the drive pulses for the second valve device. Further, the drive pulses for the third valve device are generated in phase with the corresponding drive pulses for the second valve device. It is to be understood that the drive pulse trains for the second and third valve devices are shown in FIG. 12 for illustrative purpose only, and the switching pattern of the third valve device as compared with that of the second valve device may be modified as desired. For instance, the pulse width of the drive pulses for the third valve device may be different from that of the drive pulses for the second valve device. The drive pulses for the third valve device need not have the same phase as the corresponding drive pulses for the second valve device.

In a third advantageous arrangement of the above-indicated first preferred form of the braking system including the solenoid valve opening and closing means, the controller controls the first, second and third solenoid-operated valve devices so as to control the braking pressure in each of the wheel brake cylinders in an anti-lock fashion so as to prevent an excessive amount of slip of the corresponding wheel during braking of the motor vehicle, and the solenoid valve control means comprises front pseudo-hold means for establishing a pseudo-hold mode for the front wheel brake cylinder when the pressure hold mode is selected by the control mode selecting means for the front wheel brake cylinder, irrespective of the pressure control mode selected for the rear wheel brake cylinder. The front pseudo-hold mode is established by alternately placing at least the third solenoid-operated valve device, so that the braking pressure in the front wheel brake cylinders is held constant in the pseudo-hold mode.

In the above arrangement, the braking pressure in the front wheel brake cylinder is eventually held constant, irrespective of the pressure control mode for the rear wheel brake cylinder, when the pressure hold mode is selected for the front wheel brake cylinder. Unlike the braking system according to the first advantageous arrangement of the first preferred form of the invention described above, the braking pressure in the front wheel brake cylinder is eventually held constant, even when the pressure increase mode is selected for the rear wheel brake cylinder.

In the above third advantageous arrangement, the front pseudo-hold means preferably comprise first open time determining means for determining a ratio of an open time during which the third solenoid-operated valve device is placed in the open state, to a close time during which the second solenoid-operated valve device is placed in the closed state, such that the ratio is higher when one of the pressure decrease and hold modes is selected by the control mode selecting means for the rear wheel brake cylinder than when the pressure increase mode is selected by the control mode selecting means for the rear wheel brake cylinder.

The braking pressure in the front wheel brake cylinder is eventually held constant while the braking pressure in the rear wheel brake cylinder is decreased, by alternately opening and closing the third solenoid-operated valve device, if the ratio of the open time of the third valve device to the open time of the second valve device is determined so that the amount of the brake fluid discharged from the rear wheel brake cylinder into the reservoir is equal to a sum of the fluid amount which would be supplied from the pump to the front wheel brake cylinder if the third valve device were held in the closed state, and the sum of the fluid that should be discharged from the rear wheel brake cylinder into the reservoir for reducing the braking pressure in the rear wheel brake cylinder. On the other hand, the braking pressure in the front wheel brake cylinder is eventually held constant while the braking pressure in the rear wheel brake cylinder is increased, by alternately opening and closing the third valve device, if the above-indicated ratio is determined so that the fluid amount discharged from the rear wheel brake cylinder into the reservoir is equal to the fluid amount which would be supplied from the pump to the front wheel brake cylinder if the third valve device were held closed, minus the fluid amount that should be supplied from the pump to the rear wheel brake cylinder to increase the braking pressure in the rear wheel brake cylinder. The open time of the third valve device is longer in the former case than in the latter case.

In view of the above finding, it is preferred to determine the ratio of the open time of the third valve device to that of the second valve device such that the ratio is higher when the pressure decrease mode or hold mode is selected for the rear wheel brake cylinder than when the pressure increase mode is selected for the rear wheel brake cylinder. In this arrangement, the braking pressure in the front wheel brake cylinder is eventually held constant, while the braking pressure in the rear wheel brake cylinder is controlled substantially in the pressure control mode selected by the control mode selecting means.

In the above third advantageous arrangement, the front pseudo-hold means preferably comprise second open time determining means for determining a ratio of an open time during which the third solenoid-operated valve device is placed in the open state, to a close time during which the second solenoid-operated valve device is placed in the closed state, such that the ratio is higher when a friction coefficient of a road surface on which the motor vehicle is running is relatively low than when the friction coefficient is relatively high.

The rate of flow of the brake fluid from each wheel brake cylinder into the reservoir is not held constant when the second and third solenoid-operated valve devices are both open. Where the friction coefficient of the road surface is relatively low, the above rate of flow of the brake fluid is lower than when the friction coefficient is relatively high. In this respect, it is noted that the braking pressure in each wheel brake cylinder is generally lower when the friction coefficient is relatively low than when the friction coefficient is relatively high. To accurately control the braking pressure in each wheel brake cylinder, therefore, it is desirable to determine the open time ratio of the third valve device depending upon the friction coefficient of the road surface. Described more specifically, it is desirable to determine the open time ratio of the third valve device such that the ratio is higher when the friction coefficient is relatively low than when the friction coefficient is relatively high. In this arrangement, the braking pressure in the wheel brake cylinder is compensated for a change in the friction coefficient of the road surface, so that the braking pressure is optimized with higher accuracy during an anti-lock braking operation.

According to a second aspect of this invention, there is provided a braking system of diagonal type of a motor vehicle having front right and left wheels and rear right and left wheels, the braking system having two pressure application sub-systems connected to respective two mutually independent pressurizing chambers of a master cylinder, one of the two sub-systems including a front right wheel brake cylinder for braking the front right wheel and a rear left wheel brake cylinder for braking the rear left wheel, while the other of the two sub-systems including a front left wheel brake cylinder for braking the front left wheel and a rear right wheel brake cylinder for braking the rear right wheel, each of the two sub-systems further including a front brake cylinder passage connecting the master cylinder and the front wheel brake cylinder, a rear brake cylinder passage connecting the front brake cylinder passage and the rear wheel brake cylinder, a first solenoid-operated valve device disposed in a portion of the front brake cylinder passage between the master cylinder and a point of connection between the front and rear brake cylinder passages, a second solenoid-operated valve device disposed in the rear brake cylinder passage and having an open and a closed state, a reservoir passage connected at one end thereto to a portion of the rear brake cylinder passage between the second solenoid-operated valve device and the rear wheel brake cylinder, a reservoir connected to the other end of the reservoir passage, a third solenoid-operated valve device disposed in the reservoir passage and having an open and a closed state, a pump passage connected at one end thereto to the reservoir and at the other end to a portion of the front brake cylinder passage between the first solenoid-operated valve device and the front wheel brake cylinder or a portion of the rear brake cylinder passage between the second solenoid-operated valve device and the point of connection, a pump disposed in the pump passage, for pressurizing a fluid received from the reservoir, and a controller for controlling the first, second and third solenoid-operated valve devices and the pump of the each sub-system, to control a braking pressure in each of the front and rear wheel brake cylinders of the each sub-system, so as to prevent an excessive amount of slip of the corresponding wheel, and wherein the controller includes solenoid valve control means for alternately placing the third solenoid-operated valve device in the open and closed states while at the same time holding the second solenoid-operated valve device in the open state, if a time duration for which the second and third solenoid-operated valve devices are held in the open state exceeds a predetermined threshold.

In the braking system according to this second aspect of this invention, the front wheel brake cylinder connected to the reservoir through the rear brake cylinder passage. Therefore, the braking pressure in the rear wheel brake cylinder is necessarily decreased upon decreasing of the braking pressure in the front wheel brake cylinder, irrespective of whether the braking pressure in the rear wheel brake cylinder should be decreased or not. Consequently, if the second and third solenoid-operated valve devices are held open for a long time and the braking pressure in the front wheel brake cylinder is decreased for an accordingly long time, the braking pressure in the rear wheel brake cylinder is also decreased for a time longer than necessary, whereby the rear wheel braking force may be excessively decreased.

In a front-drive motor vehicle, in particular, an engine brake is applied to the vehicle during braking of the vehicle by the braking system. Therefore, the apparent braking pressures in the front wheel brake cylinders are not zeroed even if the solenoid-operated valve devices are controlled to reduce the front wheel braking pressures to the atmospheric level. Consequently, the braking system in the front-drive motor vehicle has a tendency that the second and third solenoid-operated valve devices are both held open for a relatively long time to zero the slip ratio of the front drive wheels on a road surface having a relatively low or extremely low friction coefficient, whereby the front wheel braking pressures are held in the pressure decrease mode for a long length of time.

If the second and third solenoid-operated valve devices are held open for a long time, there is a high possibility that the braking pressures in the front wheel brake cylinders have decreased to a minimum value (substantially equal to the atmospheric pressure). In this condition, even if the second and third solenoid-operated valve devices are continuously held open, the braking pressures in the front wheel brake cylinders cannot be further reduced, and the braking pressures in the rear wheel brake cylinders may be reduced to an unnecessarily low level.

Where the second and third solenoid-operated valve devices are both held open for a time longer than a predetermined threshold, therefore, it is desirable to alternately place the third solenoid-operated valve device in the open and closed states such that this valve device is placed in the closed state for a relatively short time, so that the braking pressure in the rear wheel brake cylinder is slowly increased, while the braking pressure in the front wheel brake cylinder is decreased at a reduced rate. This arrangement is effective to prevent an excessive decrease of the rear wheel braking force.

In the light of the above, the braking system according to the second aspect of the invention is adapted such that if the time duration for which the second and third solenoid-operated valve devices are held in the open state exceeds the predetermined threshold, the third valve device is alternately placed in the open and closed states while the second valve device is held in the open state. The present braking system is capable of minimizing the decrease in the rear wheel braking force due to a long period of decrease in the braking pressure in the front wheel brake cylinder, leading to significant reduction of the required braking distance of the motor vehicle.

In one preferred form of this second aspect of the present invention, the solenoid valve control means alternately places the third solenoid-operated valve device in the open and closed states while at the same time holding the second solenoid-operated valve device in the open state, if the time duration exceeds the predetermined threshold and if a friction coefficient of a road surface on which the motor vehicle is running is lower than a predetermined value, the solenoid valve control means holding the third solenoid-operated valve device in the closed state while at the same time holding the second solenoid-operated valve device in the open state, if the time duration exceeds the predetermined threshold and if the friction coefficient is not lower than the predetermined value.

The solenoid valve control means may be arranged such that the third solenoid-operated valve device is alternately opened and closed while the second valve device is held open, in any braking condition provided that the time duration indicated above exceeds the predetermined threshold. If the friction coefficient of the road surface is relatively high, however, the amount of slip of the rear wheel does not necessarily become excessive even if the third solenoid-operated valve device is held closed rather than alternately opened and closed. Where the vehicle is braked on a road surface having a relatively high friction coefficient, the required braking distance of the vehicle can be effectively reduced by holding the third valve device in the closed state.

In view of the above finding, the solenoid valve control means provided in the above-indicated preferred form of the braking system is adapted such that the third solenoid-operated valve device is alternately placed in the open and closed states while the second solenoid-operated valve device is held in the open state, if the time duration indicated above is longer than the predetermined threshold and if the friction coefficient of the road surface is lower than the predetermined value, and such that the third solenoid-operated valve device is held in in the closed state while the second solenoid-operated valve device is held in the open state, if the time duration is longer than the predetermined threshold and if the friction coefficient is not lower than the predetermined value.

BRIEF DESCRIPTION OF THE DRAWINGS

The above and optional objects, features, advantages and industrial and technical significance of this invention will be better understood by reading the following detailed description of presently preferred embodiments of the invention, when considered in connection with the accompanying drawings, in which:

FIG. 7 is a view in a tabular form indicating a relationship among slipping conditions of front and rear wheels, and pressure control modes selected for the front and rear wheels and control states of solenoid-operated valve devices, where brake fluid is stored in a reservoir;

FIG. 8 is a view corresponding to that of FIG. 7, where the brake fluid is not stored in the reservoir;

FIG. 9 is a view in a tabular form indicating a relationship between the combinations of the operating states (control states) of the solenoid-operated valve devices and the pressure control modes selected for the front and rear wheels;

DETAILED DESCRIPTION OF THE PREFERRED EMBODIMENTS

Figure 1:
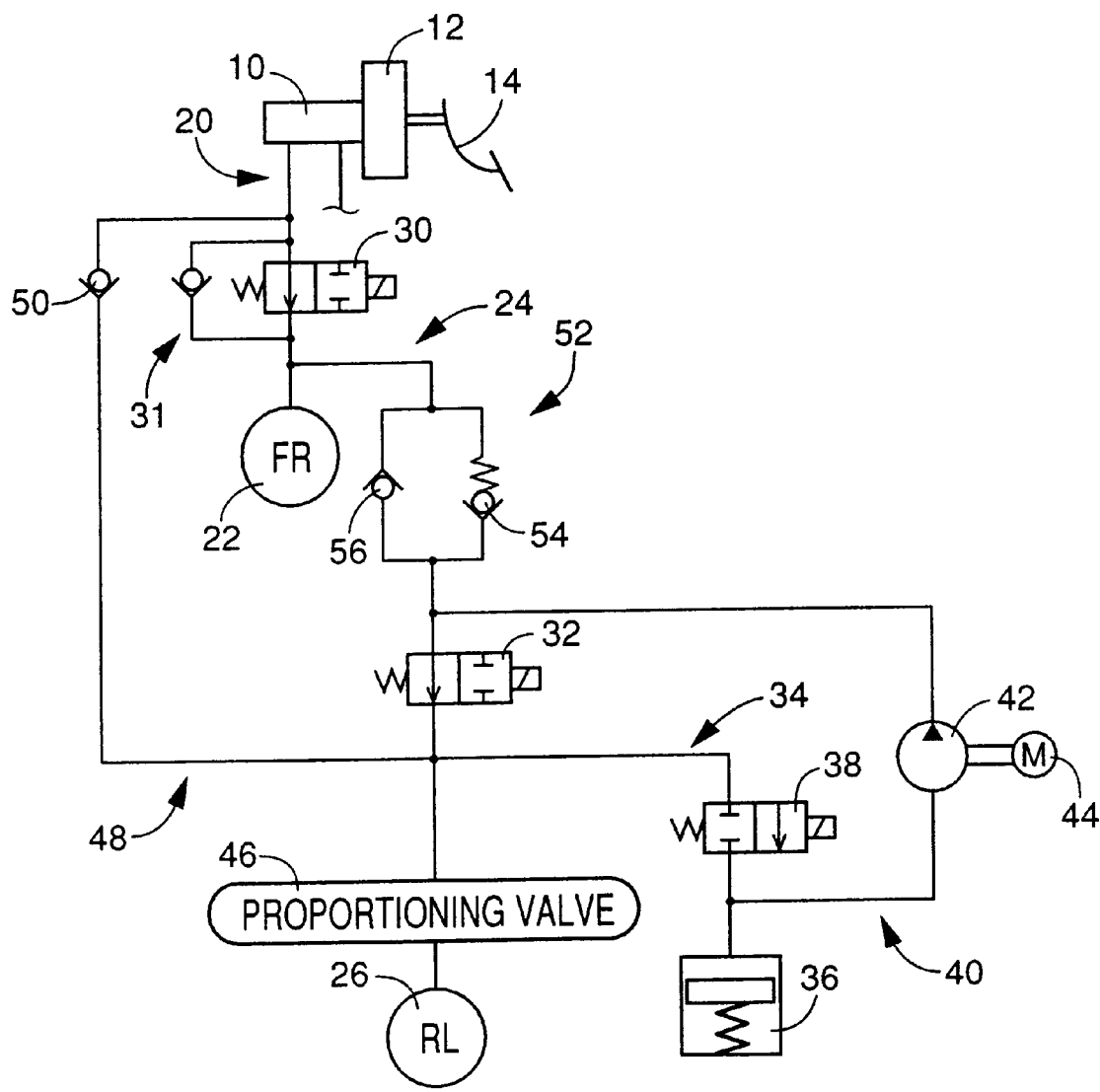
FIG. 1 is a schematic view of an anti-lock braking system of diagonal type constructed according to one embodiment of the present invention.

Referring first to FIG. 1, there is shown a mechanical arrangement of an anti-lock braking system of diagonal or X-crossing type for a motor vehicle, which is constructed according to one embodiment of this invention.

In FIG. 1, reference numeral 10 denotes a master cylinder 10 of tandem type in which two mutually independent fluid pressurizing chambers are formed in series. The master cylinder 10 is linked with a brake operating member in the form of a brake pedal 14 through a booster 12. Upon operation or depression of the brake pedal 14 by an operator of the motor vehicle, equal fluid pressures are generated in the two pressurizing chambers of the master cylinder 10, such that the generated fluid pressures vary with an operating force which acts on the brake pedal 14.

One of the pressurizing chambers of the master cylinder 10 is connected to a brake cylinder of a front left wheel and a brake cylinder of a rear right wheel of the vehicle, while the other pressurizing chamber is connected to brake cylinders of a front right wheel and a rear left wheel of the vehicle. The braking system has two mutually independent pressure application sub-systems. In the first pressure application sub-system, one of the pressurizing chambers of the master cylinder 10 functions as a pressure source, and the fluid pressures in the brake cylinders of the front left and rear right wheels are controlled. In the second pressure application sub-system, the other pressurizing chamber functions as a pressure source, and the fluid pressures in the brake cylinders of the front right and rear left wheels are controlled. Since the first and second pressure application sub-systems are identical with each other in construction, only the second pressure application sub-system will be described by reference to FIG. 1.

In the pressure application sub-system of FIG. 1, one of the pressurizing chambers of the master cylinder 10 is connected to a brake cylinder 22 of the front right wheel FR through a front brake cylinder passage 20. A rear brake cylinder passage 24 is connected at one end thereof to the front brake cylinder passage 20 and at the other end to a brake cylinder 26 of the rear left wheel RL.

In a portion of the front brake cylinder passage 20 between the master cylinder 10 and a point of connection to the rear brake cylinder passage 24, there is disposed a normally-open first solenoid-operated shut-off valve device 30. That is, the first shut-off valve device 30 is located upstream of the point of connection between the front and rear brake cylinder passages 20, 24. To the front brake cylinder passage 20, there is also connected a return passage 31 which by-passes the first shut-off valve device 30. This return passage 31 incorporates a check valve, which inhibits a flow of the fluid in the direction from the master cylinder 10 toward the front wheel brake cylinder 22, and permits a flow of the fluid in the opposite direction. The check valve in the return passage 31 is provided to return the fluid from the front wheel brake cylinder 22 back to the master cylinder 10 at a considerably high rate.

In the rear brake cylinder passage 24, there is provided a normally-open second solenoid-operated shut-off valve device 32. A reservoir passage 34 is connected at one end thereof to a portion of the rear brake cylinder passage 24 between the second shut-off valve device 32 and the rear wheel brake cylinder 26, and at the other end to a reservoir 36. In the reservoir passage 34, there is disposed a normally-closed third solenoid-operated shut-off valve device 38.

A pump passage 40 is connected at one end thereof to the reservoir passage 34 and at the other end to a portion of the rear brake cylinder passage 24 between the second shut-off valve device 32 and the point of connection to the front brake cylinder passage 20. A pump 42 driven by a motor 44 is connected to the reservoir passage 40, for pressuring the fluid received from the reservoir 36 and delivering the pressurized fluid to the above-indicated portion of the rear brake cylinder passage 24.

In a portion of the rear brake cylinder passage 24 between the second shut-off valve device 32 and the rear wheel brake cylinder 26, there is disposed a proportioning valve 46 (hereinafter referred to as "P valve 46"). The P valve 46 is a pressure reducing valve for controlling the fluid pressure in the rear wheel brake cylinder 26, according to a predetermined front-rear distribution line, as well known in the art. Described in detail, the output pressure of the P valve 46 which is applied to the rear wheel brake cylinder 26 is held equal to the input pressure (i.e., pressure in the master cylinder 10, or delivery pressure of the pump 42) until the input pressure increases to a predetermined level with an increase in the pressure in the master cylinder 10. After the input pressure reaches the predetermined level (bent point of the front-rear distribution line), the rate of increase in the output pressure is lowered with respect to the rate of increase in the input pressure. Thus, after the pressures in the front and rear wheel brake cylinders 22, 26 has been raised to a predetermined critical point, the rate of increase of the pressure in the rear wheel brake cylinder 26 is lowered with respect to that of the pressure in the front wheel brake cylinder 22, in order to prevent otherwise possible locking of the rear wheel FL due to reduction of the load acting on the rear wheel FL which arises from a transfer of the vehicle load in the forward direction during braking of the vehicle.

A return passage 48 is connected at one end thereof to a portion of the rear brake cylinder passage 24 between the P valve 46 and the second shut-off valve device 32, and at the other end to a portion of the front brake cylinder passage 20 between the master cylinder 10 and the first shut-off valve device 30. A check valve 50 is provided in this return passage 48. This check valve 48 inhibits a flow of the fluid in a direction from the master cylinder 10 toward the rear wheel brake cylinder 26, and permits a flow of the fluid in the reverse direction. The check valve 50 is provided to prevent a residual pressure in the rear wheel brake cylinder 26 which would arise from the provision of a first check valve 54 of a pressure reducing device 52 which will be described.

The pressure reducing device 52 is disposed in a portion of the rear brake cylinder passage 24 between the point of connection to the pump passage 40 and the point of connection to the front brake cylinder passage 20. This pressure reducing device 52 includes the above-indicated first check valve 54 whose opening pressure difference is not substantially zero, and a second check valve 56 whose opening pressure difference is substantially zero. The first and second check valves 54, 56 are disposed in parallel with each other and have opposite directions in which the brake fluid is permitted to flow.

There will be described flows of the brake fluid to and from the master cylinder 10, pump 42, and front and rear wheel brake cylinders 22, 26.

In a normal braking pressure control operation of the present anti-lock braking system upon depression of the brake pedal 12 without an operation of the pump 42, the brake fluid pressurized by the master cylinder 10 is supplied to the front wheel brake cylinder 22 through the normally-open first solenoid-operated shut-off valve device 30, and to the rear wheel brake cylinder 26 through the first shut-off valve device 30 and the second check valve 56 of the pressure reducing device 52. Since the opening pressure difference of the second check valve 56 is substantially zero, almost the same braking pressures are applied to the front and rear wheel brake cylinders 22, 26.

In an anti-lock braking pressure control operation of the braking system, the pump 42 is operated with the first shut-off valve device 30 held in the closed state. The fluid delivered from the pump 42 is supplied to the front wheel brake cylinder 22 through the first check valve 54, and to the rear wheel brake cylinder 26 (to the P valve 46). Since the opening pressure difference of the first check valve 54 is not zero, the pressure of the fluid to be supplied to the front wheel brake cylinder 22 is made lower than that of the fluid to be supplied to the rear wheel brake cylinder 26, by an amount corresponding to the opening pressure difference of the first check valve 54. Thus, the front-rear distribution of the braking pressures of the front and rear wheel brake cylinders 22, 26 is optimized in the anti-lock braking pressure control operation, permitting in a rapid increase in the braking pressure of the rear wheel brake cylinder 26, namely, a rapid increase in the braking force of the rear wheel brake cylinder 26, and thereby resulting in reduction in the required braking distance of the motor vehicle.

Figure 2:
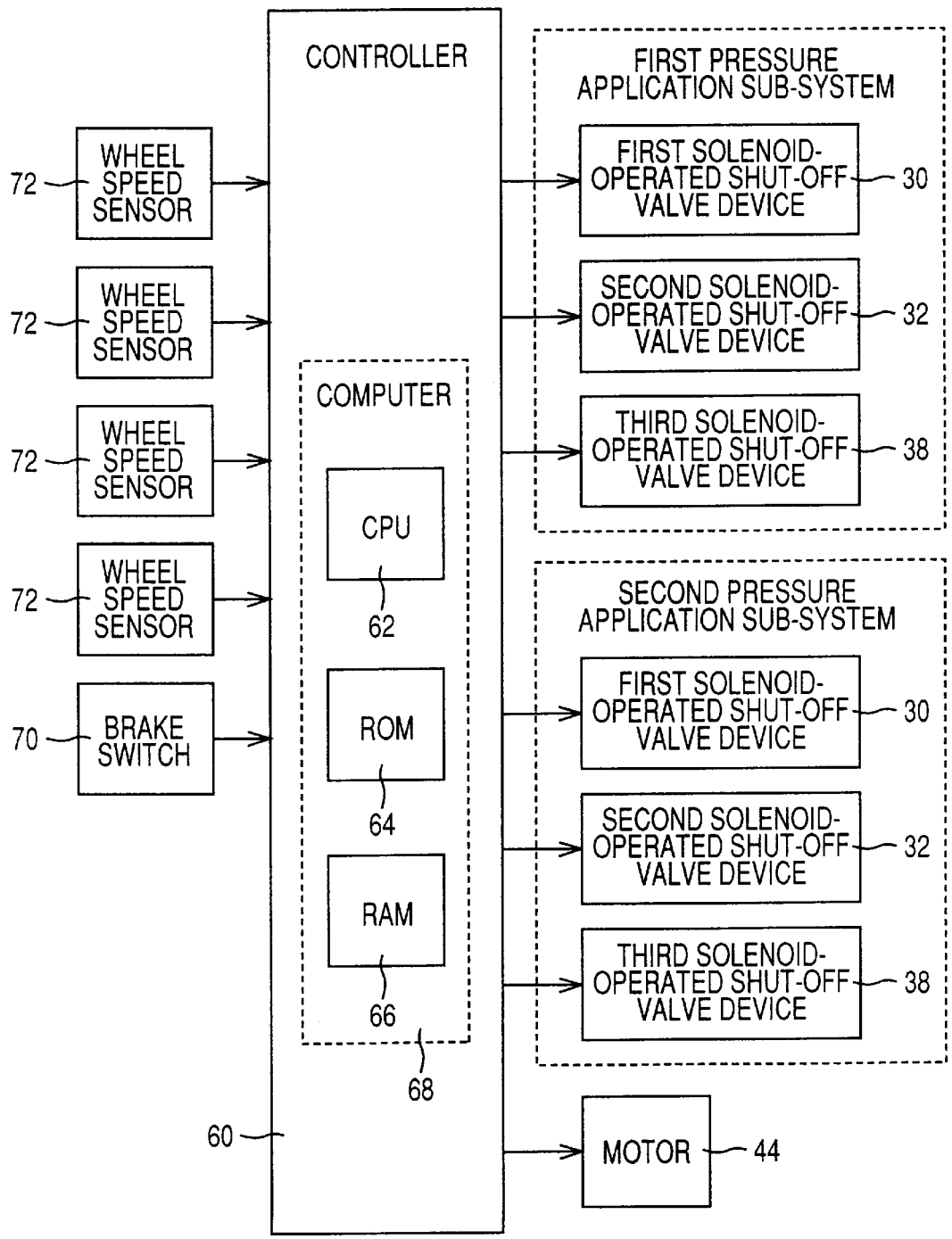
FIG. 2 is a block diagram showing an electric control system for the braking system of FIG. 1.

There will next be described an electrical control arrangement of the present braking system, by reference to the block diagram of FIG. 2.

The first, second and third solenoid-operated shut-off valve devices 30, 32, 38 and the motor 44 are controlled by a controller 60, which is constituted principally by a computer 68 incorporating a processor in the form of a central processing unit (CPU) 62, a read-only memory (ROM) 64, and a random-access memory (RAM) 66. The ROM 64 stores various control programs for controlling the braking system in an anti-lock fashion, and the CPU 62 operates to execute these programs while utilizing a temporary data storage function of the RAM 66.

To effect the anti-lock braking pressure control for each of the front and rear wheel brake cylinders 22, 26 so as to prevent locking of the corresponding wheel (prevent an excessive amount of slip of the wheel), the controller 60 is adapted to receive the output signal of a brake switch 70 indicating whether the brake pedal 14 is operated by the vehicle operator, and the output signals of wheel speed sensors 72 indicative of the rotating speeds (peripheral speeds) of the wheels FR, FR, RL, RR. On the basis of the output signals of the brake switch 70 and wheel speed sensors 72, the control 60 controls brake actuators in the form of the first, second and third solenoid-operated shut-off valve devices 30, 32, 38 of each of the first and second pressure-application sub-systems, and also controls the motor 44 for the pump 42.

Referring next to the functional block diagram of FIG. 3, various functional portions of the controller 60 will be described.

The controller 60 includes a wheel speed calculating portion 80, a vehicle speed estimating portion 82, a wheel acceleration calculating portion 84, a wheel slip calculating portion 86, a vehicle deceleration estimating portion 88, a solenoid valve state determining portion 90, and an actuator control portion 92. The wheel speed calculating portion 80 is adapted to calculate the rotating speed of each wheel, on the basis of the output signals of the wheel speed sensors 72. The wheel speed calculating portion 80 is connected to the vehicle speed estimating portion 82, the wheel acceleration calculating portion 84 and the wheel slip calculating portion 86. The vehicle speed estimating portion 82 is adapted to estimate the running speed of the motor vehicle on the basis of the rotating speeds of the four wheels, and the wheel acceleration calculating portion 84 is adapted to calculate the acceleration value of each wheel on the basis of the rotating speed of the wheel which is calculated by the wheel speed calculating portion 80 at a predetermined time interval. Namely, the acceleration value of the wheel is obtained as a difference of two wheel speed values successively calculated by the calculating portion 80. The wheel slip calculating portion 86, which is also connected to the vehicle speed estimating portion 82, is adapted to calculate an amount of slip of each wheel by subtracting the vehicle running speed estimated by the vehicle speed estimating portion 82, from the rotating speed of the wheel calculated by the wheel speed calculating portion 80. The vehicle speed estimating portion 82 is connected to the vehicle deceleration estimating portion 88. The vehicle deceleration estimating portion 88 is adapted to calculate the deceleration value of the vehicle on the basis of the vehicle running speed estimated by the estimating portion 82 at a predetermined time interval. That is, the deceleration value of the vehicle is obtained as a difference of two vehicle speed values successively estimated by the estimating portion 82.

The wheel acceleration calculating portion 84, wheel slip calculating portion 86 and vehicle deceleration estimating portion 88 are connected to the solenoid valve state determining portion 90, which is adapted to determine the operating states of the three solenoid operated shut-off valve devices 30, 32, 38, namely, to select one of a plurality of control states of the shut-off valve devices 30, 32, 38, as described below in detail. The solenoid valve state determining portion 90 is connected to an actuator control portion 92, which is adapted to apply drive signals to the solenoid-operated shut-off valve devices 30, 32, 38, on the basis of the output signal of the solenoid valve state determining portion 90.

Figure 4:
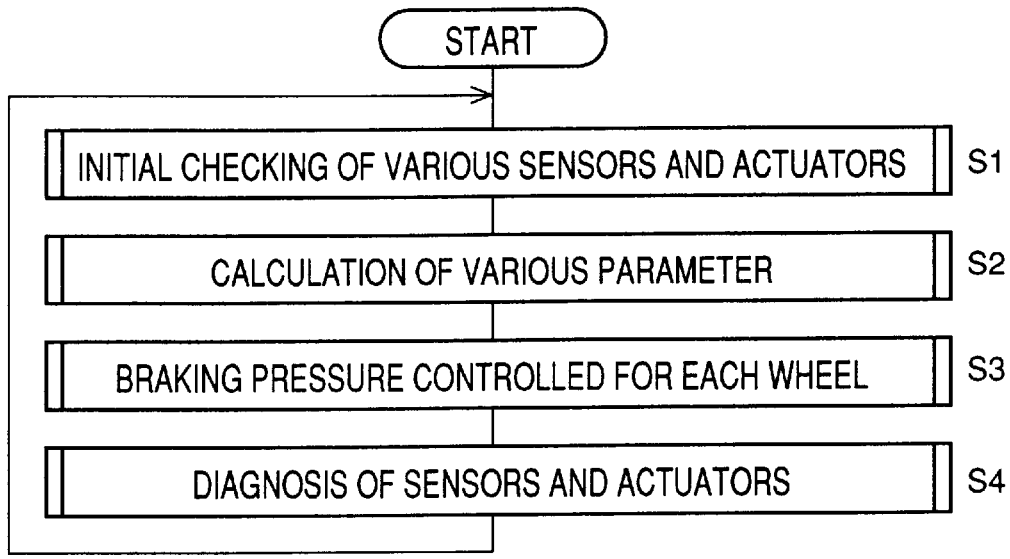
FIG. 4 is a flow chart illustrating an anti-lock braking pressure control routine stored in the ROM 64 of the controller 60.

The functions of the various portions of the controller 60 are performed by execution by the computer 68 of an anti-lock braking pressure control routine illustrated in the flow chart of FIG. 4, according to control programs stored in the ROM 64.

The routine of FIG. 4 is initiated with step Si to effect initial checking of the various sensors such as wheel speed sensors 72 and the various actuators such as the shut-off valve devices 30, 32, 38. Step S1 is followed by step S2 in which various parameters of the vehicle used to control the braking pressures are calculated. The calculated parameters indicate current braking conditions of the vehicle.

Figure 5:
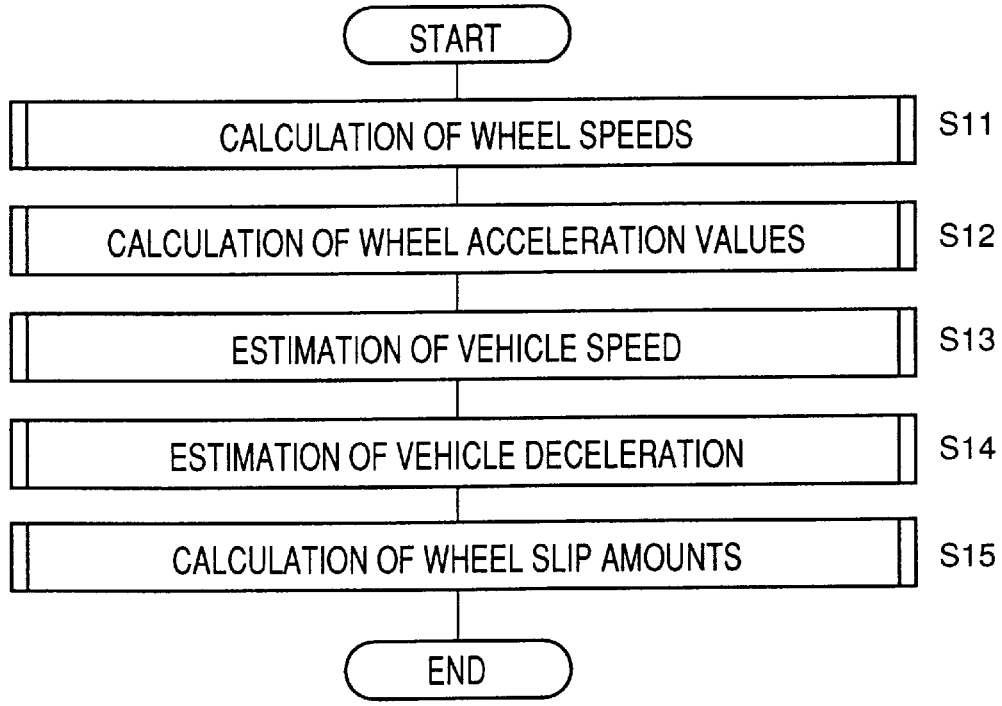
FIG. 5 is a flow chart illustrating a sub-routine executed in step S2 of the routine of FIG. 4.

The content of step S2 is shown in detail in the flow chart of FIG. 5. Namely, a routine illustrated in FIG. 5 is a sub-routine executed in step S2 of the anti-lock braking control routine of FIG. 4. The sub-routine of FIG. 5 is initiated with step S11 to calculate the rotating speeds of the wheels, on the basis of the output signals of the wheel speed sensors 72. Then, the control flow goes to step S12 to calculate the acceleration value of each wheel on the basis of a plurality of wheel speed values which have been successively calculated. Step S12 is followed by step S13 to estimate the vehicle running speed on the basis of the calculated rotating speeds of the wheels. The control flow then goes to step S14 to estimate the deceleration value of the vehicle, on the basis of a plurality of vehicle speed values which have been successively estimated. Step S15 is then implemented to calculate an amount of slip of each wheel, by subtracting the calculated wheel speed from the estimated vehicle running speed.

After the sub-routine of FIG. 5 has been executed in step S2, the control flow goes to step S3 to determine an optimum value of the braking pressure in the brake cylinder for each wheel, on the basis of the various parameters obtained in step S2, and control the braking pressure in each wheel brake cylinder.

Figure 6:
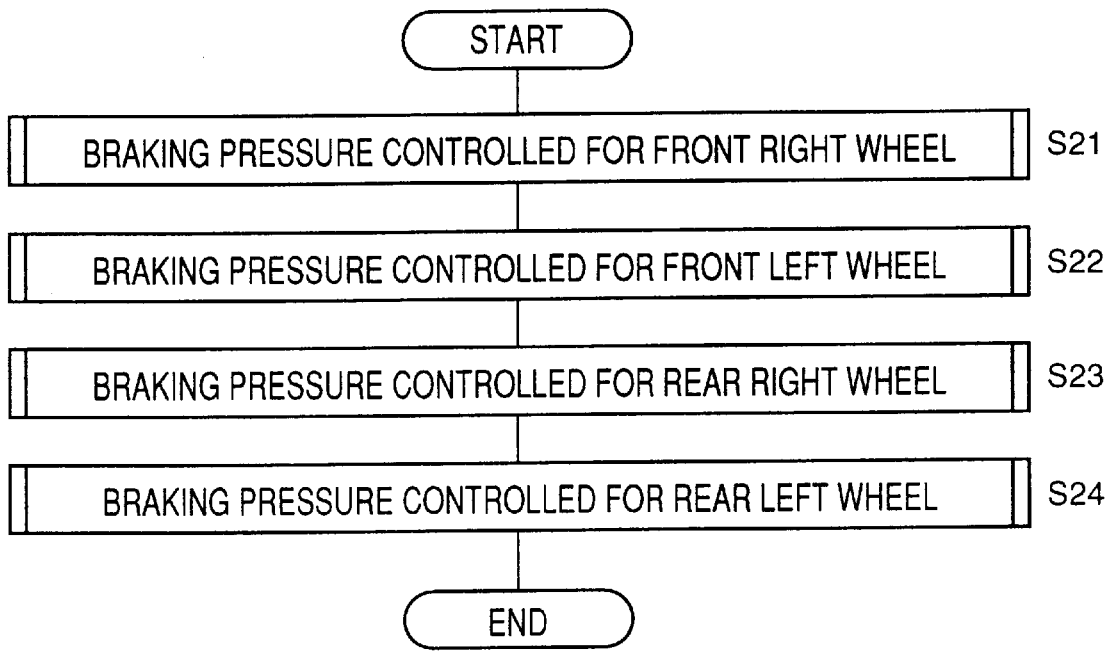
FIG. 6 is a flow chart illustrating a sub-routine executed in step S3 of the routine of FIG. 4.

The content of step S3 is shown in detail in the flow chart of FIG. 6. Namely, a routine illustrated in FIG. 6 is a sub-routine executed in step S3 of the anti-lock braking control routine of FIG. 4. The sub-routine of FIG. 6 is initiated with step S21 to control the braking pressure in the front right wheel brake cylinder 22. Step S21 is followed by step S22 to control the braking pressure in the front left wheel brake cylinder. Then, the control flow goes to step S23 to control the braking pressure in the rear right wheel brake cylinder. Finally, step S24 is implemented to control the braking pressure in the rear left wheel brake cylinder 26.

After the sub-routine of FIG. 6 has been executed in step S3, the control flow goes to step S4 to effect a diagnosis of the various sensors and actuators. Thus, one cycle of execution of the anti-lock braking pressure control routine of FIG. 4 is completed.

Figure 3:
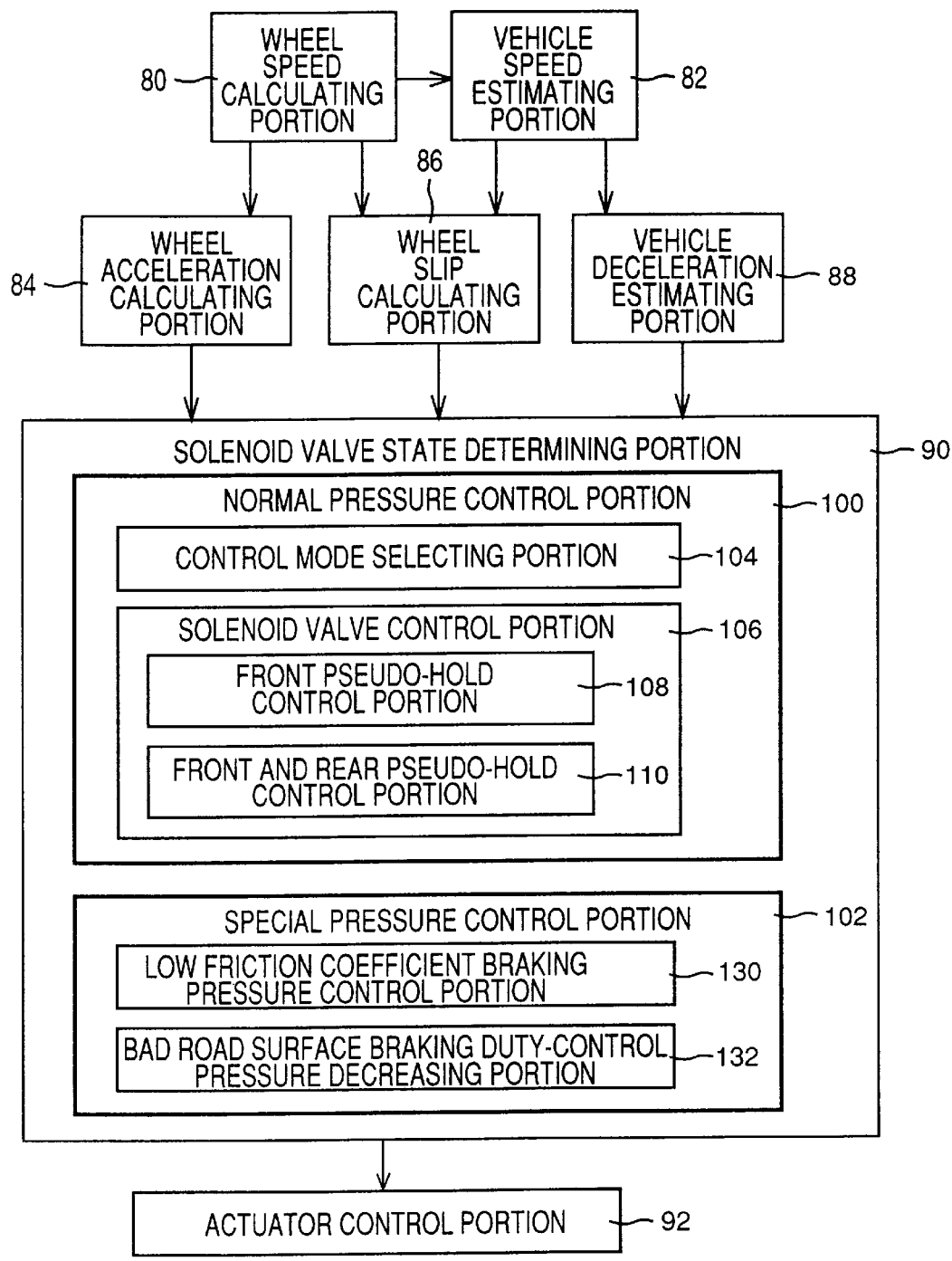
FIG. 3 is a block diagram showing an arrangement of a controller 60 used in the control system of FIG. 2.

It will be understood that the sub-routine of FIG. 6 corresponds to the solenoid valve state determining portion 90 of FIG. 3. This solenoid valve state determining portion 90 will be described in detail.

As shown in the block diagram of FIG. 3, the solenoid valve state determining portion 90 includes a normal control portion 100 and a special control portion 102. The normal control portion 100 includes control mode selecting means in the form of a control mode selecting portion 104, and solenoid valve opening and closing means in the form of a solenoid valve control portion 106.

The control mode selecting portion 104 will be described first.

The control mode selecting portion 104 is adapted to select one of a plurality of pressure control modes which consist of a pressure decrease mode, a pressure increase mode, a slow pressure increase mode and a pressure hold mode.

The pressure increase mode, which may be called a rapid pressure increase mode, consists of a master cylinder increase mode and a pump increase mode. In the master cylinder increase mode, the first solenoid-operated shut-off valve device 30 is held open, and the braking pressure in each wheel brake cylinder is rapidly increased by the pressure generated by the master cylinder 10. In the pump increase mode, the first solenoid-operated shut-off valve device 30 is closed while the pump 42 is operated, so that the braking pressure in each wheel brake cylinder is increased at a lower rate than in the master cylinder increase mode. In this respect, it is noted that the delivery of the pump 42 is minimized for reduced cost of manufacture and size of the pump 42, and that the delivery pressure of the pup 42 cannot be higher than the maximum pressure of the master cylinder 10.

Described more specifically, the control mode selecting portion 104 is arranged to select the pressure control mode for each wheel brake cylinder, according to predetermined rules, depending upon whether the slip amount of each wheel has an increasing tendency or a decreasing tendency or has sufficiently decreased. This determination is effected on the basis of the wheel acceleration value and the amount of slip of each wheel, and the estimated vehicle deceleration value.

Examples of the rules used by the control mode selecting portion 104 are indicated in tabular form in FIGS. 8 and 9.

The rule of FIG. 7 is used where the amount of brake fluid stored in the reservoir 36 is sufficient to permit the braking pressure of each wheel brake cylinder to be increased in the pump increase mode by operation of the pump 42. The rule of FIG. 8 is used where the amount of brake fluid in the reservoir 36 is not sufficient to select the pump increase mode. In the interest of simplification of explanation, the case of FIG. 7 will be referred to as the case where the brake fluid is stored in the reservoir 36, while the case of FIG. 8 will be referred to as the case where the reservoir 36 is empty.

In the tables of FIGS. 7 and 8, the following legends are used:

M INC.:Master cylinder increase mode

P INC.:Pump increase mode

DEC.:Pressure decrease mode

HLD:Pressure hold mode

S INC.:Slow pressure increase mode

According to the rule of FIG. 7 used where the brake fluid is stored in the reservoir 36, the master cylinder increase mode is selected for the front wheel brake cylinder of a given pressure application sub-system if and when an anti-lock braking pressure control operation is initiated for only the rear wheel brake cylinder of the same sub-system, as a result of an excessive slipping or locking tendency of the rear wheel. The control mode to be selected for the rear wheel brake cylinder in this case differs depending upon the slipping condition of the rear wheel. If the amount of slip of the rear wheel is excessive and has an increasing tendency, the pressure decrease mode is selected for the rear wheel brake cylinder. When the amount of slip of the rear wheel has a decreasing tendency, the pressure hold mode is selected for the rear wheel brake cylinder. If the amount of slip of the rear wheel has sufficiently decreased, then the slow pressure increase mode is selected for the rear wheel brake cylinder.

If the amount of slip of the front wheel is excessive and has an increasing tendency, on the other hand, the pressure decrease mode is selected for both of the front and rear wheel brake cylinders, irrespective of the slipping condition of the rear wheel.

If the amount of slip of the front wheel has a decreasing tendency, the pressure hold mode is selected for the front wheel brake cylinder, irrespective of the slipping condition of the rear wheel. If an anti-lock braking pressure control operation is not effected for the rear wheel, at this time, the pump increase mode is selected for the rear wheel. If the amount of slip of the rear wheel is also excessive and has an increasing tendency, the pressure decrease mode is selected for the rear wheel brake cylinder. If the amount of slip of the rear wheel has a decreasing tendency, the pressure hold mode is selected for the rear wheel brake cylinder. If the amount of slip of the rear wheel has sufficiently decreased, the pump increase mode is selected for the rear wheel brake cylinder.

After the amount of slip of the front wheel has sufficiently decreased, the slow pressure increase mode is selected for both of the front and rear wheel brake cylinders, if an anti-lock braking pressure control operation is not effected for the rear wheel. If the amount of slip of the rear wheel is excessive and has an increasing tendency, the pump increase mode is selected for the front wheel brake cylinder, while the pressure decrease mode is selected for the rear wheel brake cylinder. If the amount of slip of the rear wheel has a decreasing tendency, the pump increase mode is selected for the front wheel brake cylinder while the pressure hold mode is selected for the rear wheel brake cylinder. After the amount of slip of the rear wheel has sufficiently decreased, the slow pressure increase mode is selected for both of the front and rear wheel brake cylinders.

While the rule of FIG. 8 used where the reservoir 36 is empty is basically similar to the rule of FIG. 7 used where the brake fluid is stored in the reservoir 36, the pump increase mode is replaced by the master cylinder increase mode, with respect to the front wheel brake cylinder. That is, if the amount of slip of the rear wheel is excessive and has an increasing tendency after the amount of slip of the front wheel has sufficiently decreased, the master cylinder increase mode is selected for the front wheel brake cylinder while the pressure decrease mode is selected for the rear wheel brake cylinder. If the amount of slip of the rear wheel has a decreasing tendency after the amount of slip of the front wheel has sufficiently decreased, the master cylinder increase mode is selected for the front wheel brake cylinder while the pressure hold mode is selected for the rear wheel brake cylinder. If the amount of slip of the front wheel has a decreasing tendency and if an anti-lock braking pressure control operation is not effected for the rear wheel or if the slip amount of the rear wheel has sufficiently decreased, the pump increase mode is selected for the rear wheel brake cylinder as in the case where the brake fluid is stored in the reservoir 36. Since the reservoir 36 is empty, however, the pump increase mode is not available, whereby the pressure hold mode is selected for the rear wheel brake cylinder as well as for the front wheel brake cylinder.

Then, there will be described the solenoid valve control portion 106.

The solenoid valve control portion 106 is adapted to command the solenoid-operated shut-off valve devices 30, 32, 38 to be appropriately opened and closed, so as to establish the pressure control modes selected by the control mode selecting portion 104. As shown in FIG. 3, the solenoid valve control portion 106 includes front pseudo-hold means in the form of a front Pseudo-Hold control portion 108, and front and rear pseudo-hold means in the form of a front and rear Pseudo-Hold control portion 110.

1) Basic Control of Shut-off Valve Devices

Each of the solenoid-operated shut-off valve devices 30, 32, 38 has two operating states, namely, an open state and a closed state. Therefore, there are available eight combinations of the operating states of the three solenoid-operated shut-off valve devices 30, 32, 38, as indicated in the table of FIG. 9. That is, there are available eight basic control states (Nos. 1 through 8) of the valve devices 30, 32, 38. In the table, "o" and "x" represent the open and closed states of each valve device 30, 32, 38, respectively, and "Fr" and "Rr" represent the front and rear wheel brake cylinders (front and rear wheels), respectively. "M/C INCREASE" indicates the master cylinder increase mode.

To establish the master cylinder increase mode for the front wheel brake cylinder, namely, to establish the control states Nos. 1–3, the first shut-off valve device 30 is opened irrespective of the pressure control mode selected for the rear wheel brake cylinder. However, the operating states of the second and third shut-off valve devices 32, 38 are determined depending upon the pressure control mode selected for the rear wheel brake cylinder. Where the master cylinder increase mode (control state No. 1) is selected for the rear wheel brake cylinder, the second shut-off valve device 32 is opened while the third shut-off valve 38 is closed. Where the pressure hold mode (control state No. 2) is selected for the rear wheel brake cylinder, the second and third shut-off valve devices 32, 38 are both closed. Where the pressure decrease mode (control state No. 3) is selected for the rear wheel brake cylinder, the second shut-off valve device 32 is closed while the third shut-off valve device 38 is opened. During a normal braking operation of the braking system (without an an anti-lock braking pressure control), the master cylinder increase mode is established for both the front and rear wheel brake cylinders, that is, the control state No. 1 is established.

Where the pump increase mode is established for the front wheel brake cylinder, that is, where the control states Nos. 4 and 5) are established, the first shut-off valve device 30 is closed irrespective of the pressure control mode selected for the rear wheel brake cylinder. Where the pressure hold mode (control state NO. 4) is selected for the rear wheel brake cylinder, the second and third shut-off valve devices 32, 38 are both closed. Where the pressure decrease mode (control state No. 5) is selected for the rear wheel brake cylinder, the second and third shut-off valve devices 32, 38 are closed and opened, respectively.

Where the pressure hold mode is selected for the front wheel brake cylinder while the pump increase mode is selected for the rear wheel brake cylinder, that is, where the control state No. 6 of the shut-off valve devices 30, 32, 38 is established, the first and third shut-off valve devices 30, 38 are closed while the second shut-off valve device 32 is opened.

Where the combination of the pressure control modes selected for the front and rear wheel brake cylinders corresponds to one of the eight control states of the valve devices 30, 32, 38 indicated in FIG. 9, each of these valve devices is opened or closed by the solenoid valve control portion 106, according to the relationship of FIG. 9. The control of the valve devices 30, 32, 38 according to the relationship of FIG. 9 is referred to as the basic control.

The eight basic control states indicated in FIG. 9 include the control state No. 8 in which the three solenoid-operated shut-off valve devices 30, 32, 38 are all placed in the open states. This control state No. 8 is established to feed the brake fluid from the master cylinder 10 to the reservoir 36 when the reservoir 36 is empty, so that the pump increase mode is available.

2) Auxiliary Control (Duty-Control) of Shut-off Valve Devices

Where the combination of the pressure control modes selected for the front and rear wheel brake cylinders does not correspond to any one of the basic control states of FIG. 9, this combination of the selected pressure control modes is established by alternately opening and closing of at least one of the three solenoid-operated shut-off valve devices 30, 32, 38 for a period as required. This control is referred to as the auxiliary control of the shut-off valve devices 30, 32, 38. This auxiliary control to alternately placing the shut-off valve device in question in the open and closed states is considered a kind of duty control.

The tables of FIGS. 7 and 8 also indicate the auxiliary control or duty control of the solenoid-operated shut-off valve devices 30, 32, 38, which differs depending upon whether the brake fluid is stored in the reservoir 36 or not.

a) Where the brake fluid is stored in the reservoir 36 a-1) Where the master cylinder increase mode is established for the front wheel brake cylinder while the slow increase mode is established for the rear wheel brake cylinder In this case, the control state No. 1 and the control state No. 2 are alternately established. In the control state No. 1, the first and second shut-off valve devices 30, 32 are both opened while the third shut-off valve device 38 is closed, as indicated in FIG. 9. In the control state NO. 2, the first shut-off valve device 30 is opened while the second and third shut-off valve devices 32, 38 are both closed. Alternate establishment of these control states Nos. 1 and 2 is repeated. Accordingly, the third shut-off valve device 32 is duty-controlled (alternately opened and closed) while the first and second shut-off valve devices 30, 38 are held open and closed, respectively, whereby the braking pressure in the rear wheel brake cylinder is slowly increased by the master cylinder 10.

a-2) Where the pressure hold mode is established for the front wheel brake cylinder while the pressure decrease mode is established for the rear wheel brake cylinder In this case, the control state No. 4 and the control state No. 7 are alternately established. In the control state No. 4, the shut-off valve devices 30, 32, 38 are all closed. In the control state No. 7, the first shut-off valve device 30 is closed while the second and third shut-off valve devices 32, 38 are both open. Alternate establishment of these control states Nos. 4 and 7 is repeated. Accordingly, the second and third shut-off valve devices 32, 38 are both duty-controlled (alternately opened and closed) while the first shut-off valve device 30 is held closed. Although there is not a solenoid-operated shut-off valve device for disconnecting the pump 42 and the front wheel brake cylinder 22, the braking pressure in the front wheel brake cylinder 22 can be held constant. In the present case, therefore, a so-called pseudo-hold mode is provided for the front wheel brake cylinder, by the front Pseudo-Hold control portion 108, as described below in detail.

a-3) Where the pressure hold is established for both of the front and rear wheel brake cylinders In this case, the control state No. 4, the control state No. 7, the control state No. 4 and the control state No. 6 are established in the order of description and in a repeated fashion. In the control state No. 6, the first and third shut-off valve devices 30, 38 are both closed while the second shut-off valve device 32 is open. Thus, the second and third shut-off valve devices 32, 38 are both duty-controlled, whereby the braking pressures in the front and rear wheel brake cylinders are both held constant, even in the absence of the shut-off valve for disconnecting the pump 42 and the front wheel brake cylinder 22. In this case, the pseudo-hold mode is provided for the front and rear wheel brake cylinders, by the front and rear Pseudo-Hold control portion 110, as described below in detail.

a-4) Where the slow pressure increase mode is established for both of the front and rear wheel brake cylinders In this case, the control state No. 6 and the control state No. 4 are alternately established. Thus, the second shut-off valve device 32 is duty-controlled (alternately opened and closed) while the first and third shut-off valve devices 30, 38 are both held closed. As a result, the braking pressures in the front and rear wheel brake cylinders are both slowly increased by the pump 42.

b) Where the reservoir 36 is empty b-1) Where the master cylinder increase mode is established for the front wheel brake cylinder while the slow increase mode is established for the rear wheel brake cylinder, or where the pressure hold mode is established for the front wheel brake cylinder while the pressure decrease mode is established for the rear wheel brake cylinder, or where the pressure hold mode is established for both of the front and rear wheel brake cylinders In this case, the solenoid-operated shut-off valve devices 30, 32, 38 are controlled in the same manner as in the case where the brake fluid is stored in the reservoir 36.

b-2) Where the slow pressure increase mode is established for both of the front and rear wheel brake cylinders In this case, the control state No. 1, the control state No. 6, the control state No. 2 and the control state No. 4 are established in the order of description and in a repeated fashion. Accordingly, the first and second shut-off valves 30, 32 are duty-controlled (alternately opened and closed), whereby the braking pressures in the front and rear wheel brake cylinders are both slowly increased by the master cylinder 10.

b-3) Where the master cylinder increase mode is established for the front wheel brake cylinder while the pressure decrease mode is established for the rear wheel brake cylinder In this case, the control state No. 3 and the control state No. 5 are alternately established. In the control state No. 5, the first and second shut-off valve devices 30, 32 are both closed while the third shut-off valve device 38 is open, as indicated in FIG. 9. Described in detail, the first shut-off valve device 30 is duty-controlled (alternately opened and closed) while the second and third shut-off valve devices 32, 38 are held closed and open, respectively. As a result, the braking pressure in the front wheel brake cylinder is increased in the master cylinder increase mode, at a rate substantially equal to that in the pump increase mode where the brake fluid is stored in the reservoir 36, and at the same time the braking pressure in the rear wheel brake cylinder is decreased.

b-4) Where the master cylinder increase mode is established for the front wheel brake cylinder while the pressure hold mode is established for the rear wheel brake cylinder In this case, the control state No. 2 and the control state No. 4 are alternately established. That is, the first shut-off valve device 30 is duty-controlled (alternately opened and closed) while the second and third shut-off valve devices 32, 38 are both held closed. As a result, the braking pressure in the front wheel brake cylinder is increased in the master cylinder increase mode, at a rate substantially equal to that in the pump increase mode where the reservoir 36 is not empty, and at the same time the braking pressure in the rear wheel brake cylinder is held constant.

Then, the front Pseudo-Hold control portion 108 and the front and rear Pseudo-Hold control portion 110 will be described in detail.

1) Front Pseudo-Hold Control Portion 108

Figure 10:
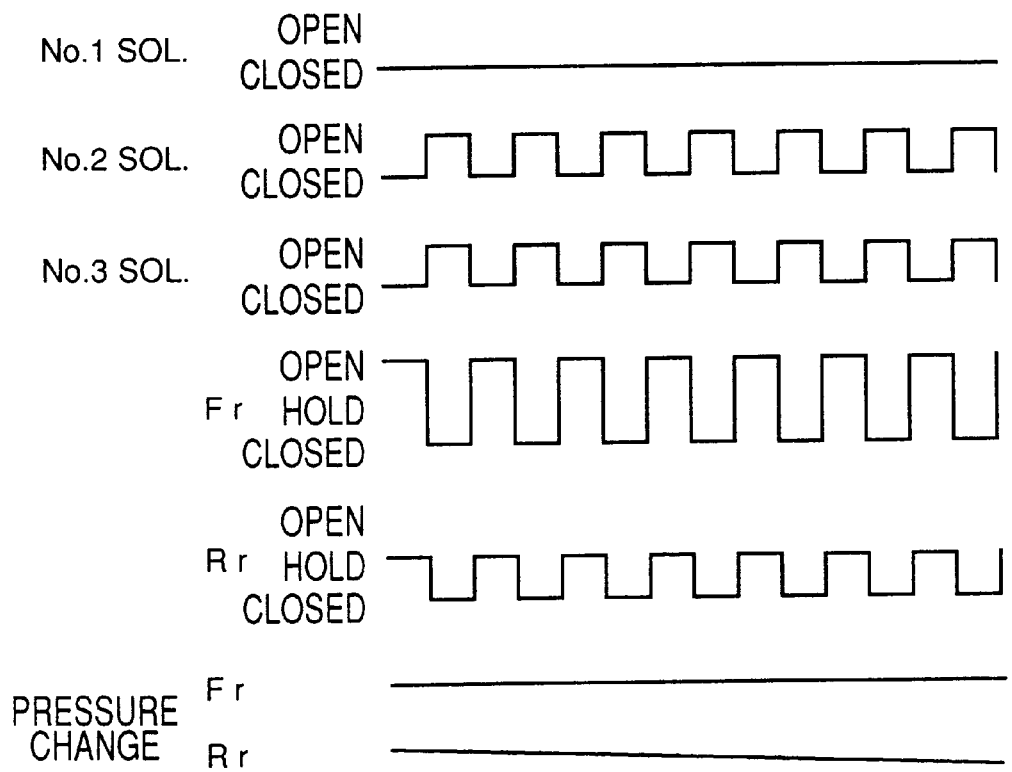
FIG. 10 is a graph for explaining a function of a front Pseudo-Hold control portion 180 shown in FIG. 3.

The front Pseudo-Hold Control portion 108 is operated when the pressure hold mode is selected for the front wheel brake cylinder while the pressure decrease mode is selected for the rear wheel brake cylinder. In this case, the second and third solenoid-operated shut-off valve devices 32, 38 are both duty-controlled while the first solenoid-operated shut-off valve device 30 is held closed, as indicated in FIG. 10 wherein the valve devices 30, 32, 38 are indicated as No. 1 SOL., No. 2 SOL. and NO. 3 SOL., respectively. As a result, the braking pressure in the front wheel brake cylinder is virtually held constant. The second shut-off valve 32 is alternately opened and closed, while the third shut-off valve 32 is alternately opened and closed in synchronization with the opening and closing actions of the second shut-off valve device 32. That is, the pattern of alternate switching between the open and closed states of the third shut-off valve device 38 is the same as that of the second shut-off valve device 32. With the alternate switching actions of the two shut-off valve devices 32, 38, the braking pressure in the front wheel brake cylinder (indicated at Fr in FIG. 10) is alternately decreased and increased, and is eventually held constant. On the other hand, the braking pressure in the rear wheel brake cylinder (indicated at Rr in FIG. 10) is alternately decreased and held constant, and is eventually slowly decreased.

In the specific example of FIG. 10, the drive pulse trains for the second and third shut-off valve devices 32, 38 are the same in not only the pulsing period but also the drive pulse width. However, the identical drive pulse width for the second and third valve devices 32, 38 is not essential. The drive pulse width should be tuned depending upon the flow resistance of the brake fluid. It is also noted that the pulse trains for the valve devices 32, 38 in the example of FIG. 10 have the same phase for synchronization of the opening and closing action of the valve device 32 with those of the valve device 38. However, the generation of the pulse trains in phase with each other for the valve devices 32, 38 is not essential, either. Actually, the two pulse trains may have a phase difference. These aspects also apply to the front and rear Pseudo-Hold control portion 110, which will be described.

Figure 11:
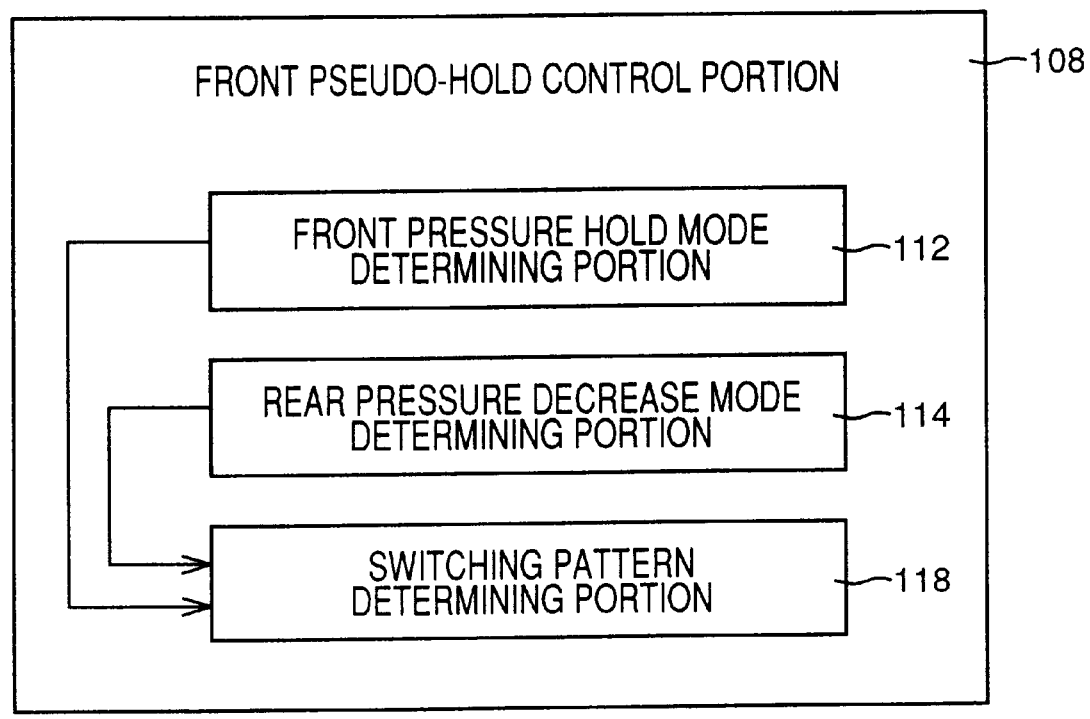
FIG. 11 is a block diagram indicating functional portions of the front Pseudo-Hold control portion 180.

To achieve the function described above, the front Pseudo-Hold control portion 108 includes functional portions as indicated in FIG. 11, namely, (a) a front pressure hold mode determining portion 112 for determining whether the pressure hold mode is selected for the front wheel brake cylinder, (b) a rear pressure decrease determining portion 114 for determining whether the pressure decrease mode is selected for the rear wheel brake cylinder, and (c) a switching pattern determining portion 118 for determining a switching pattern of the second and third solenoid-operated shut-off valve devices 32, 38.

2) Front and Rear Pseudo-Hold Control Portion 110

Figure 12:
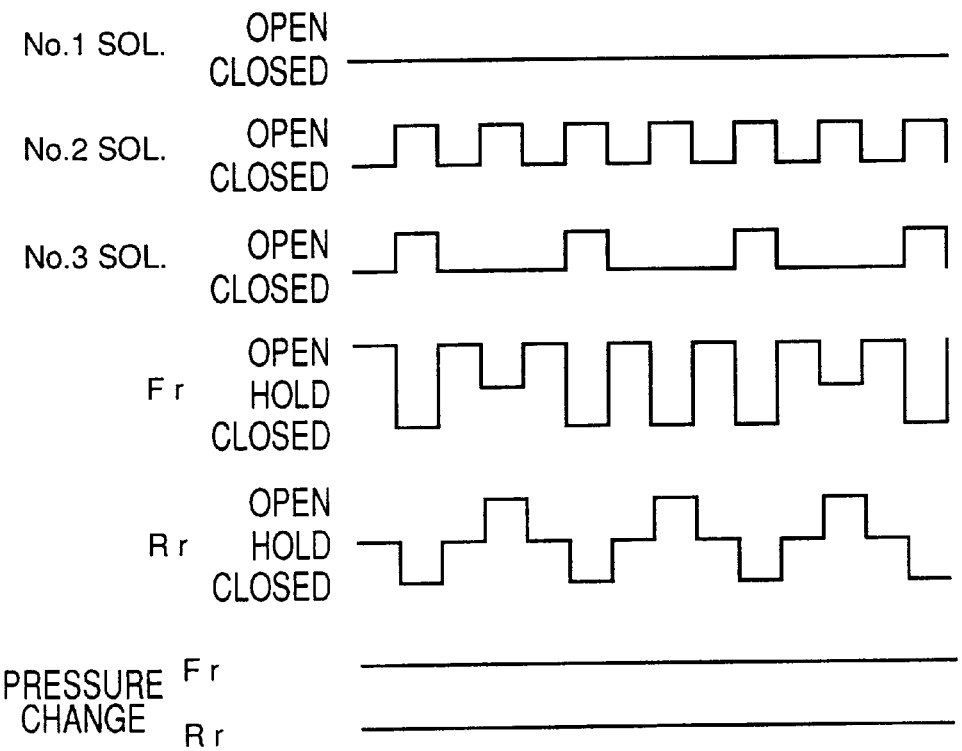
FIG. 12 is a graph for explaining a front and rear Pseudo-Hold control portion 110 shown in FIG. 3.

The front and rear Pseudo-Hold control portion 110 is operated where the pressure hold mode is selected for both of the front and rear wheel brake cylinders of the same pressure application sub-system. In this case, the second and third shut-off valve devices 32, 38 are both duty-controlled while the first shut-off valve device 30 is held closed, as indicated in FIG. 12. As a result, the braking pressures in the front and rear wheel brake cylinders are both virtually held constant. The second shut-off valve device 32 is alternately opened and closed, while the third shut-off valve device 38 is alternately opened and closed such that every other drive pulse for opening the valve device 38 is eliminated with respect to the drive pulses for the valve device 32, and such that the drive pulses applied to the valve device 38 have the same phase as the drive pulses applied to the valve device 32. With the shut-off valve devices 32, 38 alternately opened and closed in the switching patterns indicated in FIG. 12, the braking pressure in the front wheel brake cylinder is decreased, increased, held and increased for substantially equal periods, in the order of description and in a repeated fashion. Although this sequential decrease, increase, hold and increase tends to increase the braking pressure in the front wheel brake cylinder, the braking pressure in the front wheel brake cylinder is virtually held constant since the braking pressure in the front wheel brake cylinder is increased at a lower rate than that in the rear wheel brake cylinder, as explained before. On the other hand, the braking pressure in the rear wheel brake cylinder is decreased, held, increased and held for substantially equal periods, in the order of description and in a repeated fashion, whereby the braking pressure in the rear wheel brake cylinder is also eventually held constant.

Figure 13:
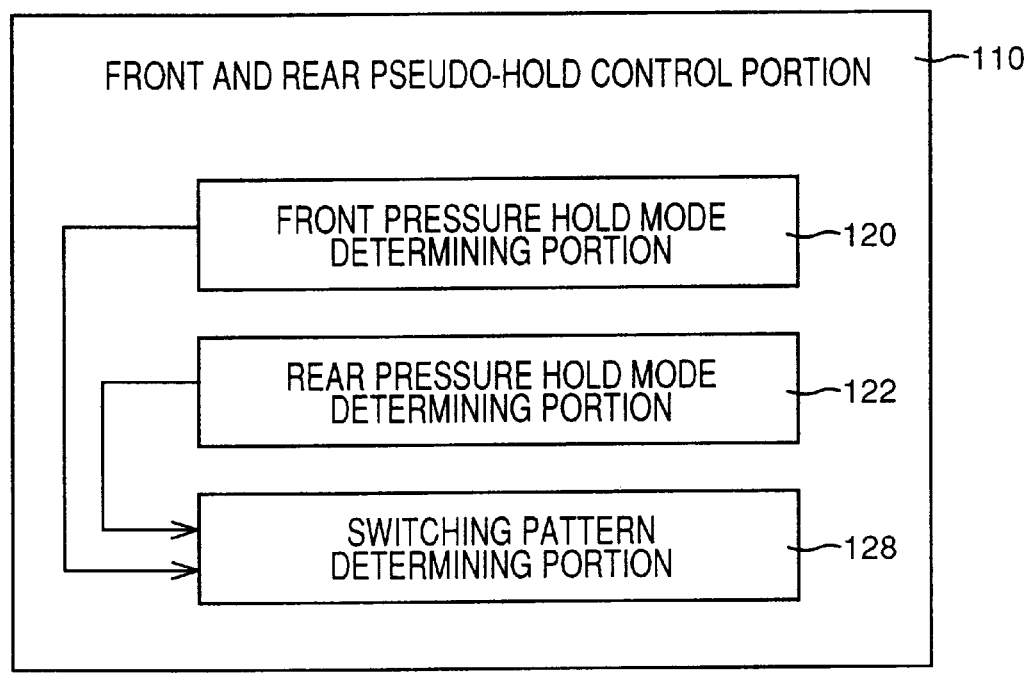
FIG. 13 is a block diagram indicating functional portions of the front and rear Pseudo-Hold control portion 110.

To achieve the function described above, the front and rear Pseudo-Hold control portion 110 includes functional portions as indicated in FIG. 13, namely, (a) a front pressure hold mode determining portion 120 for determining whether the pressure hold mode is selected for the front wheel brake cylinder, (b) a rear pressure hold mode determining portion 122 for determining whether the pressure hold mode is selected for the rear wheel brake cylinder, and (c) a switching pattern determining portion 128 for determining a switching pattern of the second and third solenoid-operated shut-off valve devices 32, 38.

Figure 14:
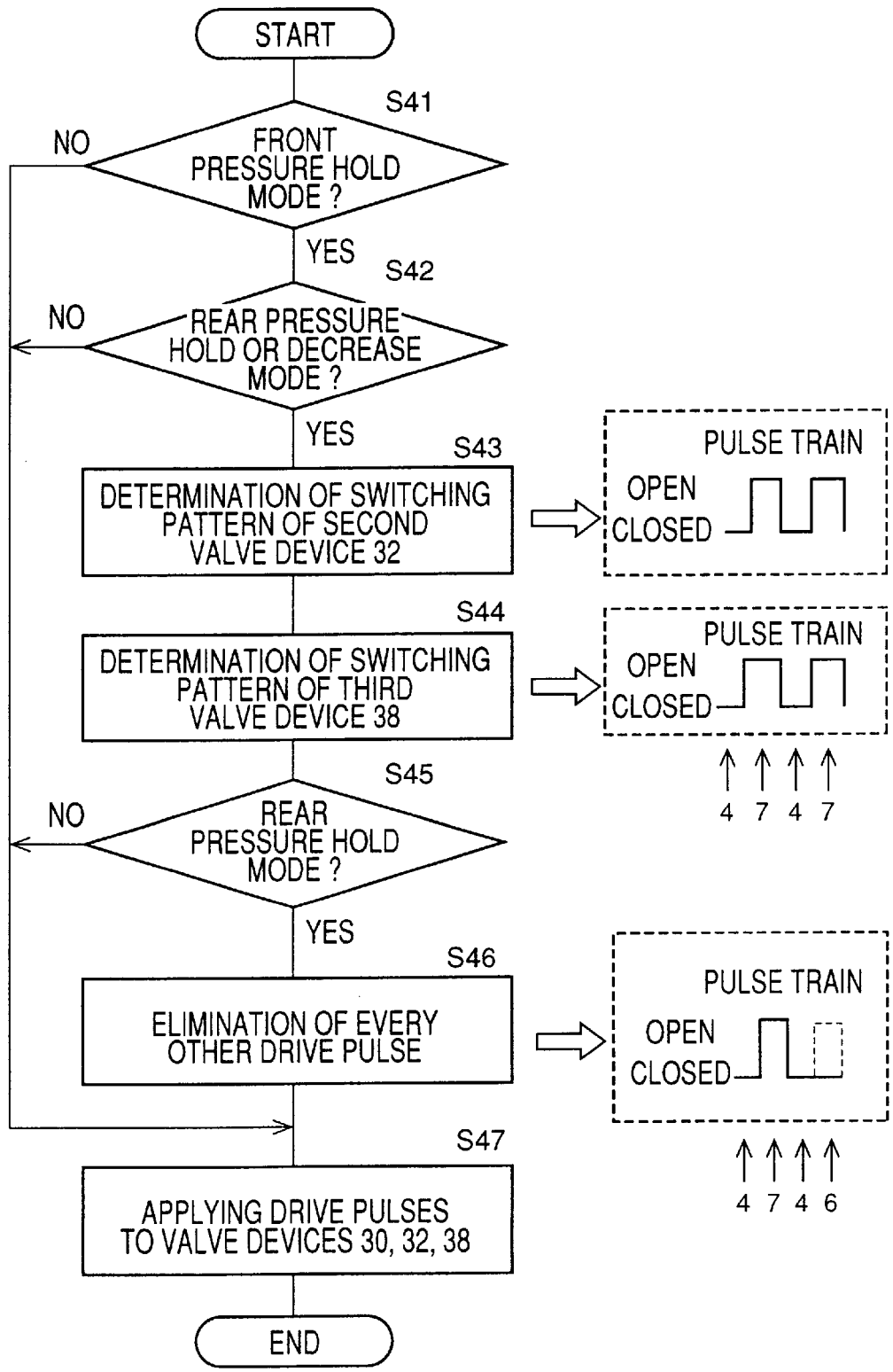
FIG. 14 is a flow chart illustrating a pseudo pressure hold control routine executed by the control portions 108, 110.

The functions of the front Pseudo-Hold control portion 108 and the front and rear Pseudo-Hold control portion 110 are performed by execution by the computer 68 of a pseudo pressure control routine illustrated in the flow chart of FIG. 14, according to control programs stored in the ROM 64.

The routine of FIG. 14, which is executed with a predetermined cycle time, is initiated with step S41 to determine whether the pressure hold mode is selected for the front wheel brake cylinder. If a negative decision (NO) is obtained in step S41, one cycle of execution of the routine of FIG. 14 is terminated. If an affirmative decision (YES) is obtained in step S41, the control flow goes to step S41 to determine whether the pressure decrease or hold mode is selected for the rear wheel brake cylinder, namely, to determine whether the so called "Pseudo Hold" control is required for the front wheel brake cylinder or for both of the front and rear wheel brake cylinders. If a negative decision (NO) is obtained in step S42, one cycle of execution of the routine of FIG. 14 is terminated.

If an affirmative decision (YES) is obtained in step S42, the control flow goes to step S43 to determine the switching pattern of the second solenoid-operated shut-off valve device 32 as described above. Step S43 is followed by step S44 to determine the switching pattern of the third solenoid-operated shut-off valve device 38 as described above by reference to FIG. 10, so that the pseudo-hold mode is established for the front wheel brake cylinder only.

Then, the control flow goes to step S45 to determine whether the pressure hold mode is selected for the rear wheel brake cylinder, namely, to determine whether the "Pseudo Hold" control is required for both of the front and rear wheel brake cylinders. If a negative decision (NO) is obtained in step S45, the control flow goes to step S47 while skipping step S46. In step S47, the three solenoid-operated shut-off valves 30, 32, 38 are controlled with suitable drive signals being applied thereto. That is, the first shut-off valve 30 is held closed, and the second and third shut-off valves 32, 38 are alternately opened and closed in the switching patterns which have been determined in steps S43 and S44, respectively. One cycle of execution of the routine of FIG. 14 is terminated with step S47. In the above case where the pressure hold mode is not selected for the rear wheel brake cylinder, the second and third shut-off valves 32, 38 are duty-controlled in the switching patterns indicated in FIG. 10, and the braking pressure in the front wheel brake cylinder only is virtually held constant.

If the pressure hold mode is selected for the rear wheel brake cylinder, that is, if an affirmative decision (YES) is obtained in step S45, the control flow goes to step S46 to determine the switching pattern of the third shut-off valve 38 indicated in FIG. 12, which is obtained by eliminating every other drive pulse of the switching pattern determined in step S44. Step S46 is followed by step S47 in which the shut-off valves 30, 32, 38 are controlled, with the shut-off valves 32, 38 being alternately opened and closed in the switching patterns of FIG. 12, so that the braking pressures in both of the front and rear wheel brake cylinders are virtually held constant. Thus, one cycle of execution of the routine is terminated.

It will be understood that a portion of the computer 68 of the controller 60 assigned to implement step S41 constitutes the front pressure hold mode determining portions 112, 120, while a portion of the computer 68 assigned to implement step S42 constitutes the rear pressure decrease mode determining portions 114 and the rear pressure hold ode determining portion 122. It will also be understood that a portion of the computer 68 assigned to implement steps S43, S44 and S46 constitutes the switching pattern determining portions 118, 128, while a portion of the computer 68 assigned to implement step S47 constitutes the actuator control portion 92 described above.

In the present embodiment, the front Pseudo-Hold control portion 108 and the front and rear Pseudo-Hold control portion 110 constitute an example of solenoid valve control means for controlling the solenoid-operated valve devices 30, 32, 38.

While the normal control portion 100 of the solenoid valve state determining portion 90 has been described above, there will be described the special control portion 102 of the solenoid valve state determining portion 90.

The special control portion 102 includes a low friction coefficient braking pressure control portion 130, and a bad road surface braking duty-control pressure decreasing portion 132, which will be described below.

1) Low Friction Coefficient Braking Pressure Control Portion 130

This pressure control portion 130 is adapted to terminate the pressure decrease mode if the pressure decrease mode is established for the front wheel brake cylinder for a long time during braking on a road surface having a relatively low friction coefficient $\mu$. In this case, the pressure control portion 130 controls the third solenoid-operated shut-off valve device 38 such that the valve device 38 is temporarily placed in the closed position.

Figure 15:
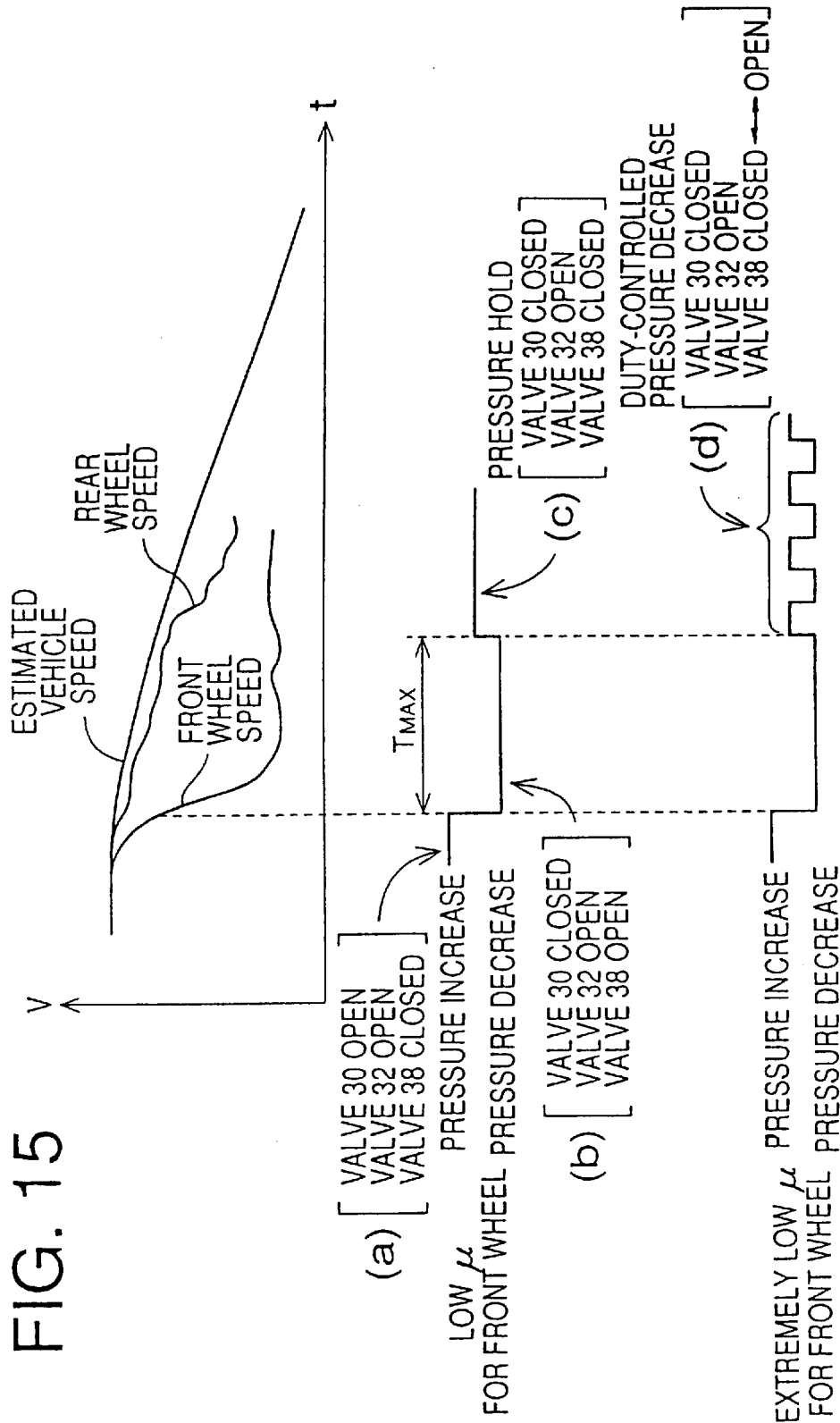
FIG. 15 is a graph for explaining a function of a low friction coefficient braking control portion 130 shown in FIG. 3.

During a normal braking operation during running of the vehicle on a road surface having a relative low friction coefficient $\mu$, the first and second shut-off valve devices 30, 32 are placed in the open states while the third shut-off valve device 38 is placed in the closed position, as indicated at (a) in FIG. 15. In this case, the braking force acting on the wheel may be excessive with respect to the friction coefficient $\mu$ of the road surface. If the amount of slip of the front wheel, for example, has an increasing tendency, the pressure decrease mode is established for not only the front wheel brake cylinder but also the rear wheel brake cylinder, even when the amount of slip of the rear wheel is not excessive. To this end, the first shut-off valve device 30 is closed, and the second and third shut-off valves 32, 38 are both opened, as indicated at (b) in FIG. 15.

If the amount of slip of the front wheel decreases as a result of the establishment of the pressure decrease mode for the front wheel brake cylinder, the pressure decrease mode is cancelled. In some cases, however, the amount of slip of the front wheel may not decrease even after the pressure decrease mode has been established for a relatively long time. In such an event, the pressure decrease mode is also established for the rear wheel brake cylinder, and the speed of the rear wheel tends to become close to the estimated vehicle running speed, whereby the rear braking force tends to be insufficient.

In view of the above inconvenience, the low friction coefficient braking pressure control portion 130 is arranged to close the third shut-off valve device 38, as indicated at (c) in FIG. 15, if the period of time for which the pressure decrease mode has been established for the front wheel brake cylinder exceeds a predetermined threshold $T_{max}$. As a result, the braking pressure in the front wheel brake cylinder is slowly increased while the braking pressure in the rear wheel brake cylinder is relatively rapidly increased, whereby the braking force applied to the rear wheel is increased to reduce the required braking distance of the vehicle even when the friction coefficient $\mu$ of the road surface is relatively low.

When the road surface has an extremely low friction coefficient $\mu$, for example, when the road surface is frozen, however, the braking pressure in the rear wheel brake cylinder may be excessive with respect to the friction coefficient of the road surface if the third shut-off valve 38 is held closed for a relatively long time.

In view of the above drawback, the low friction coefficient braking pressure control portion 130 is arranged to duty-control (alternately open and close) the third shut-off valve device 38 as indicated at (d) in FIG. 15, where the friction coefficient $\mu$ of the road surface is extremely low, so that the rate of increase in the braking pressure in the front wheel brake cylinder is made lower than in the case (c), while the braking pressure in the rear wheel brake cylinder is slowly increased.

To achieve the function described above, the low friction coefficient braking pressure control portion 130 includes an enabling portion 134 and an output control portion 136.

Figure 16:
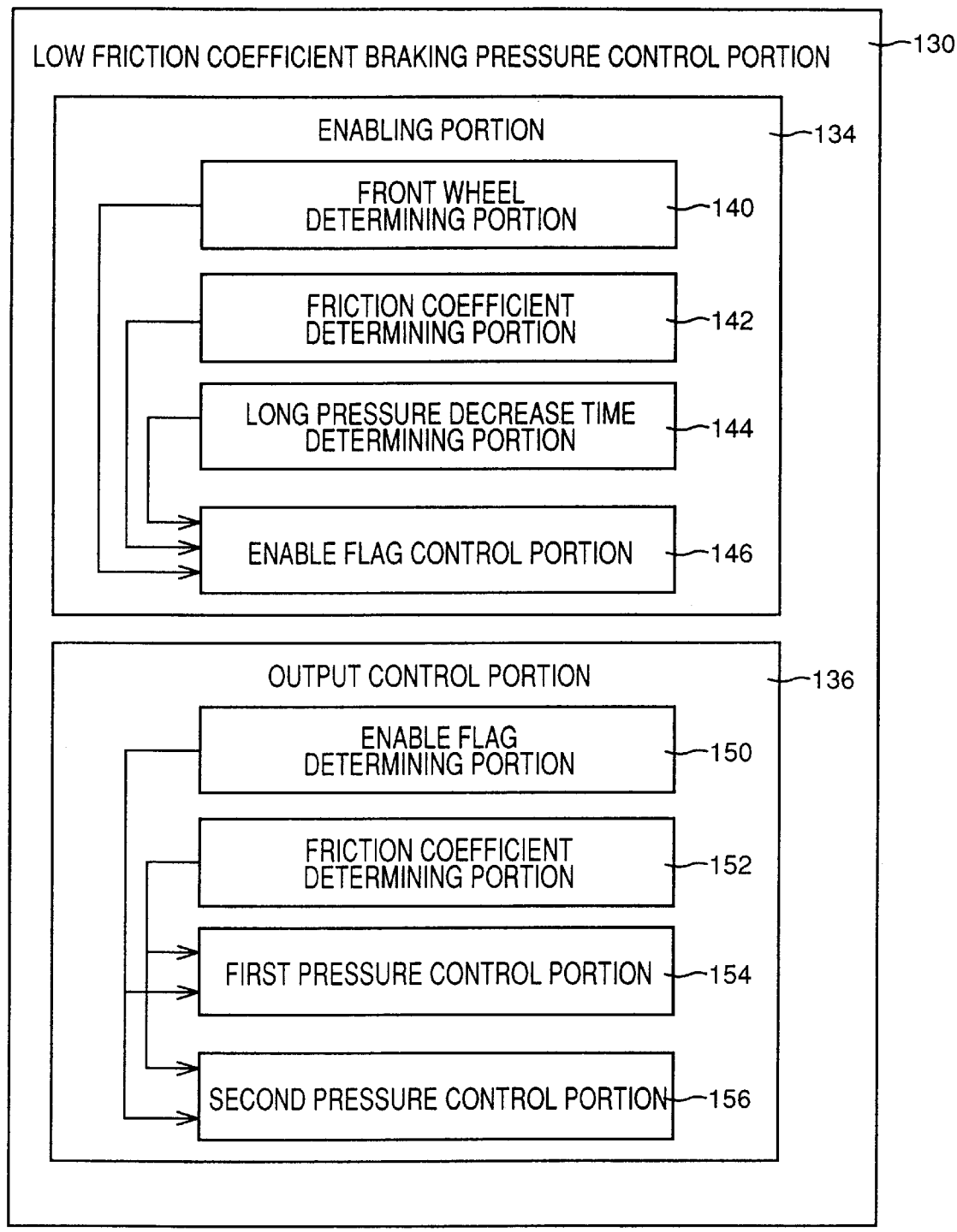
FIG. 16 is a block diagram indicating functional portions of the low friction coefficient braking control portion 130.

The enabling portion 134 is provided to permit or inhibit the operation of the low friction coefficient braking pressure control portion 130. As shown in FIG. 16, the enabling portion 134 includes (a) a front wheel determining portion 140 for determining whether the rear for which an anti-lock braking pressure control operation is currently effect is a rear wheel, (b) a friction coefficient determining portion 142 for determining whether the friction coefficient $\mu$ of the road surface is lower than a first threshold value $\mu D1$, (c) a long pressure decrease time determining portion 144 for determining whether the period of time for which the pressure decrease mode has been established for the front wheel brake cylinder exceeds the threshold $T_{max}$, and (d) an ENABLE flag control portion 146 for setting an ENABLE flag to "1" when the operation of the low friction coefficient braking pressure control portion 130 should be permitted.

The output control portion 136 is provided to control the third shut-off valve device 38. As shown in FIG. 16, the output control portion 136 includes (a) an ENABLE flag determining portion 150 for determining whether the ENABLE flag is set at "1", (b) a friction coefficient determining portion 152 for determining whether the friction coefficient $\mu$ of the road surface is lower than a second threshold value $\mu D2$, which is lower than the first threshold $\mu D1$, (c) a first pressure control portion 154 which is operated when the friction coefficient $\mu$ is lower than the first threshold $\mu D1$ but is higher than the second threshold $\mu D2$, to hold the third shut-off valve device 38 in the closed position, so that the pressure hold mode (more precisely, the slow pressure increase mode, which is not considered to be the pseudo-hold mode) is established for the front wheel brake cylinder, while the pressure increase mode is established for the rear wheel brake cylinder, and (d) a second pressure control portion 156 which is operated when the friction coefficient $\mu$ is lower than the second threshold $\mu D2$, to duty-control the third shut-off valve device 38, so that a duty-controlled pressure decrease mode is established for the front wheel brake cylinder, while a duty-controlled pressure increase mode is established for the rear wheel brake cylinder.

Figure 17:
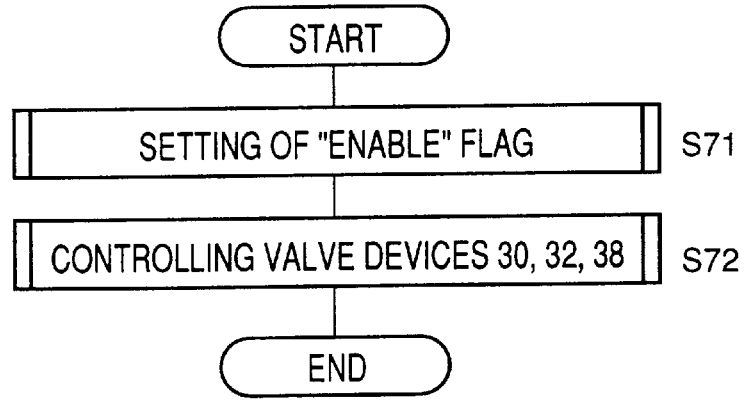
FIG. 17 is a flow chart illustrating a low friction coefficient braking control routine executed by the control portion 130.

The function of the low coefficient braking pressure control portion 130 is performed by execution by the computer 68 of a low friction coefficient braking pressure control routine illustrated in the flow chart of FIG. 17, according to control programs stored in the ROM 64.

The routine of FIG. 17, which is executed with a predetermined cycle time, is initiated with step S71 to determine whether the operation of the low friction coefficient braking pressure control portion 130 should be permitted or not.

Figure 18:
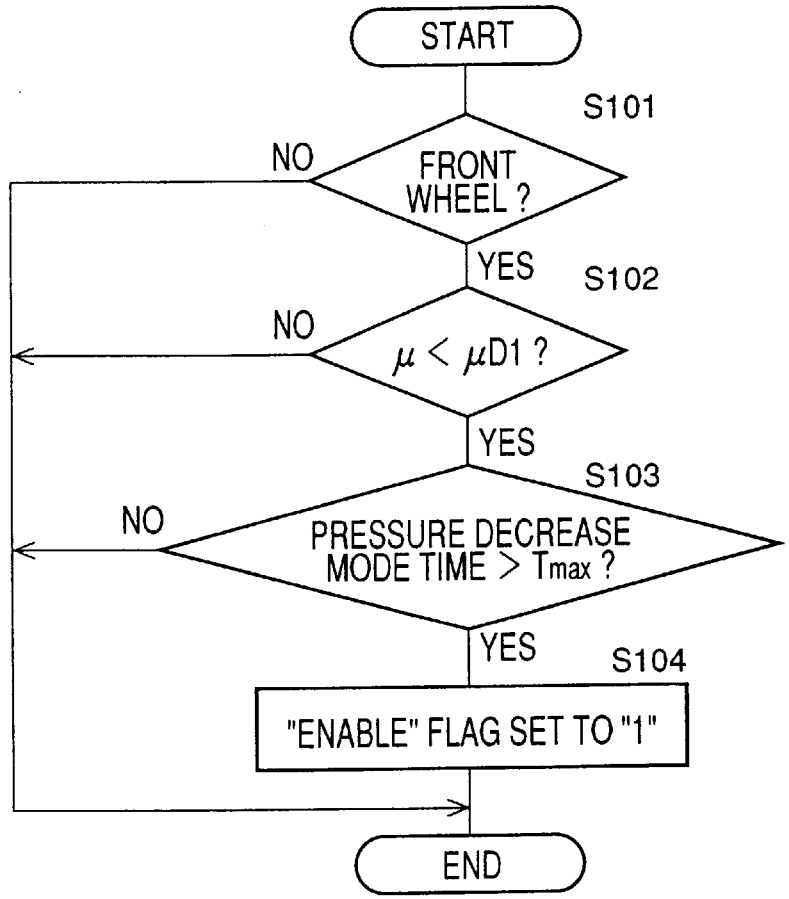
FIG. 18 is a flow chart illustrating a sub-routine executed in step S71 of the routine of FIG. 17.

The content of Step S71 is shown in detail in the flow chart of FIG. 18. Namely, a routine illustrated in the flow chart of FIG. 18 is a sub-routine executed in step S71 of the routine of FIG. 17.

The sub-routine of FIG. 18 is initiated with step S101 to determine whether the wheel for which the anti-lock braking pressure control operation is effected is a rear wheel. If a negative decision (NO) is obtained in step S101, one cycle of execution of the sub-routine of FIG. 18 is terminated. If an affirmative decision (YES) is obtained in step S101, the control flow goes to step S102 to determine whether the friction coefficient $\mu$ of the road surface which reflects and may replace the estimated vehicle deceleration is lower than the first threshold value $\mu$D1. If a negative decision (NO) is obtained in step S102, one cycle of execution of the sub-routine of FIG. 18 is terminated. If an affirmative decision (YES) is obtained in step S102, the control flow goes to step S103 to determine whether the time duration for which the pressure decrease mode has been established for the front wheel brake cylinder exceeds the predetermined threshold $T_{max}$. If a negative decision (NO) is obtained in step S103, one cycle of execution of the present sub-routine is terminated. If an affirmative decision (YES) is obtained in step S103, step S104 is implemented to set the ENABLE flag to "1". It is noted that this ENABLE flag is initially set at "0" when the computer 68 is turned on. One cycle of execution of the sub-routine of FIG. 18 is completed with step S104.

With the step S71 implemented as described above, the control flow goes to step S72 in which the solenoid-operated shut-off valve devices 30, 32, 38 are controlled.

Figure 19:
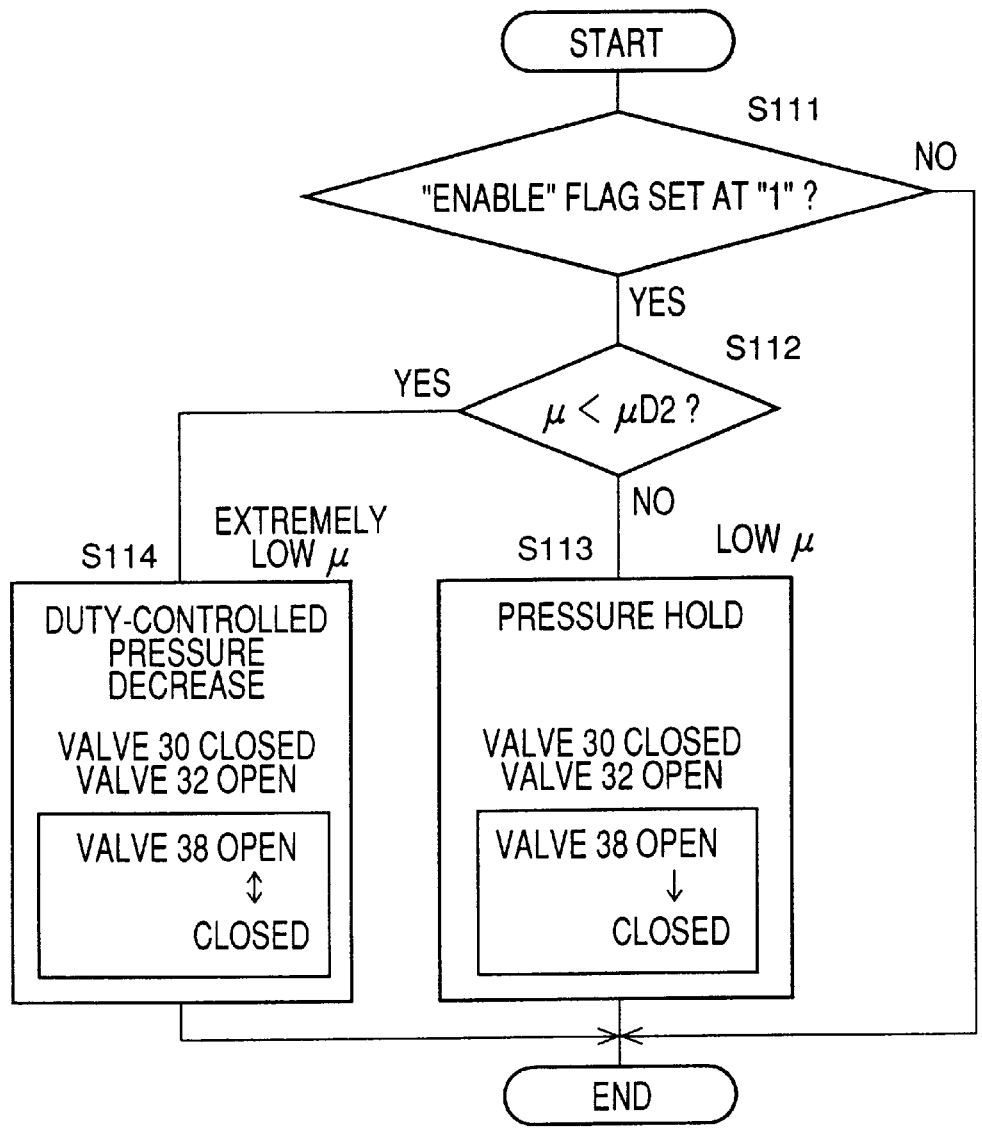
FIG. 19 is a flow chart illustrating a sub-routine executed in step S72 of the routine of FIG. 17.

The content of step S72 is shown in detail in the flow chart of FIG. 19. Namely, a routine illustrated in the flow chart of FIG. 19 is a sub-routine executed in step S72 of the routine of FIG. 17. The sub-routine of FIG. 19 is initiated with step S111 to determine whether the ENABLE flag is set at "1". If a negative decision (NO) is obtained in step S111, one cycle of execution of the sub-routine of FIG. 19 is terminated. If an affirmative decision (YES) is obtained in step S111, the control flow goes to step S112 to determine whether the friction coefficient $\mu$ of the road surface is lower than the second threshold value $\mu$D2. If a negative decision (NO) is obtained in step S112, the control flow goes to step S113 in which the third shut-off valve device 38 is closed while the first and second shut-off valve devices 30, 32 are held closed and open, respectively, whereby the pressure hold mode is established for the front wheel brake cylinder. If an affirmative decision (YES) is obtained in step S112, the control flow goes to step S114 in which the third shut-off valve device 38 is alternately opened and closed in the predetermined switching pattern while the first and second shut-off valve devices 30, 32 are held closed and open, respectively, whereby the duty-controlled pressure decrease mode is established for the front wheel brake cylinder. One cycle of execution of the sub-routine of FIG. 19 is completed with step S113 or S114.

With the step S72 implemented as described above, one cycle of execution of the low friction coefficient braking pressure control routine of FIG. 17 is completed.

It will be understood that portions of the computer 68 assigned to implement steps S101, S102, S103 and S104 of FIG. 18 constitute the front wheel determining portion 140, the friction coefficient determining portion 142, the long pressure decrease time determining portion 144 and the ENABLE flag control portion 146. It will also be understood that portions of the computer 68 assigned to implement steps S111, S112, S113 and S114 of FIG. 19 constitute the ENABLE flag determining portion 150, the friction coefficient determining portion 152, the first pressure control portion 154 and the second pressure control portion 156.

In the present embodiment, the low friction coefficient braking pressure control portion 130 is an example of the solenoid valve control means for controlling the solenoid-operated shut-off valve devices 30, 32, 38.

2) Bad Road Surface Braking Duty-Control Pressure Decreasing Portion 132

This bad road surface braking duty-control pressure decreasing portion 132 is operated when the road surface condition is relatively bad, to replace the normal pressure decrease mode with the duty-controlled pressure decrease mode in which the rate of decrease of the braking pressure is lower than in the normal pressure decrease mode.

Figure 20:
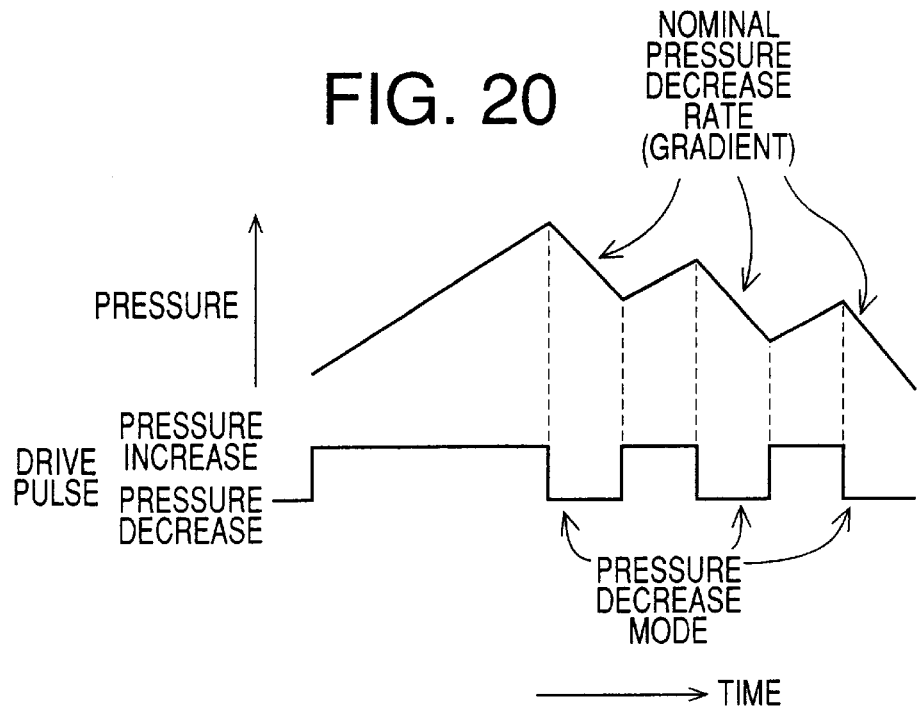
FIGS. 20 and 21 are graphs for explaining a function of a bad road surface braking duty-control pressure decreasing portion 132 shown in FIG. 3.
Figure 21:
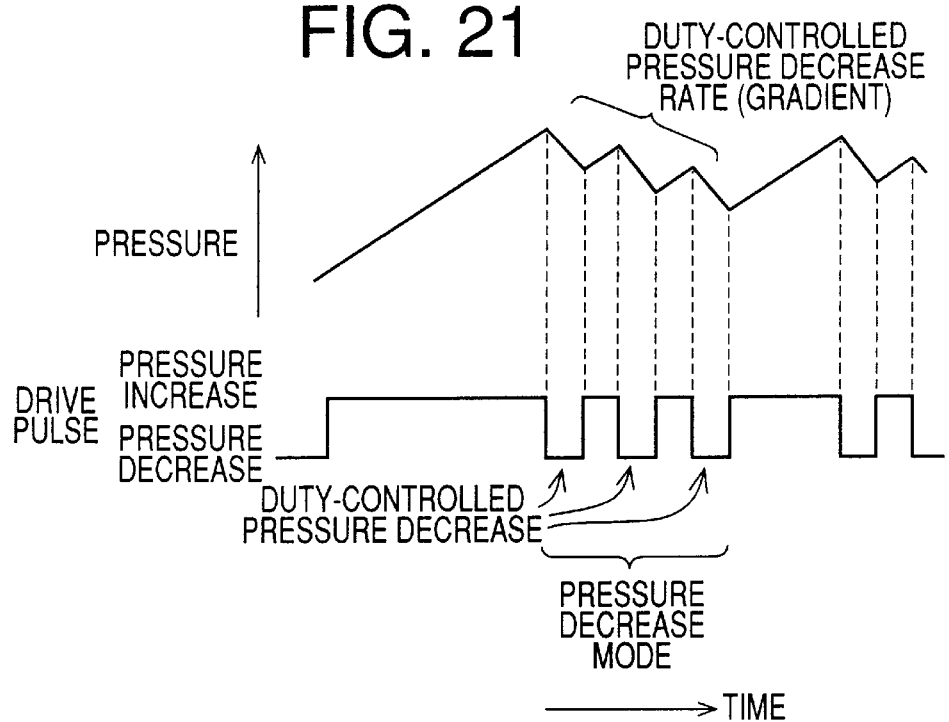

If the braking pressure in a wheel brake cylinder is reduced in the normal pressure decrease mode during braking on a bad road surface having considerably raised and recessed portions, as well as during braking on a smooth straight road surface, the pressure decrease mode is frequently established at a relatively short interval, as indicated in FIG. 20. In this case, the selection of the pressure decrease mode tends to be oscillatory, causing the braking pressure to be likely to decrease to an unnecessary extent, resulting in an insufficient braking force acting on the appropriate wheel. To avoid such a drawback, the bad road surface braking duty-control pressure decreasing portion 132 of the special control portion 102 is adapted to establish the duty-control pressure decrease mode for a lower rate of decrease in the braking pressure than in the normal pressure decrease mode, as indicated in FIG. 21, if the road surface condition is found to be relatively bad.

Figure 22:
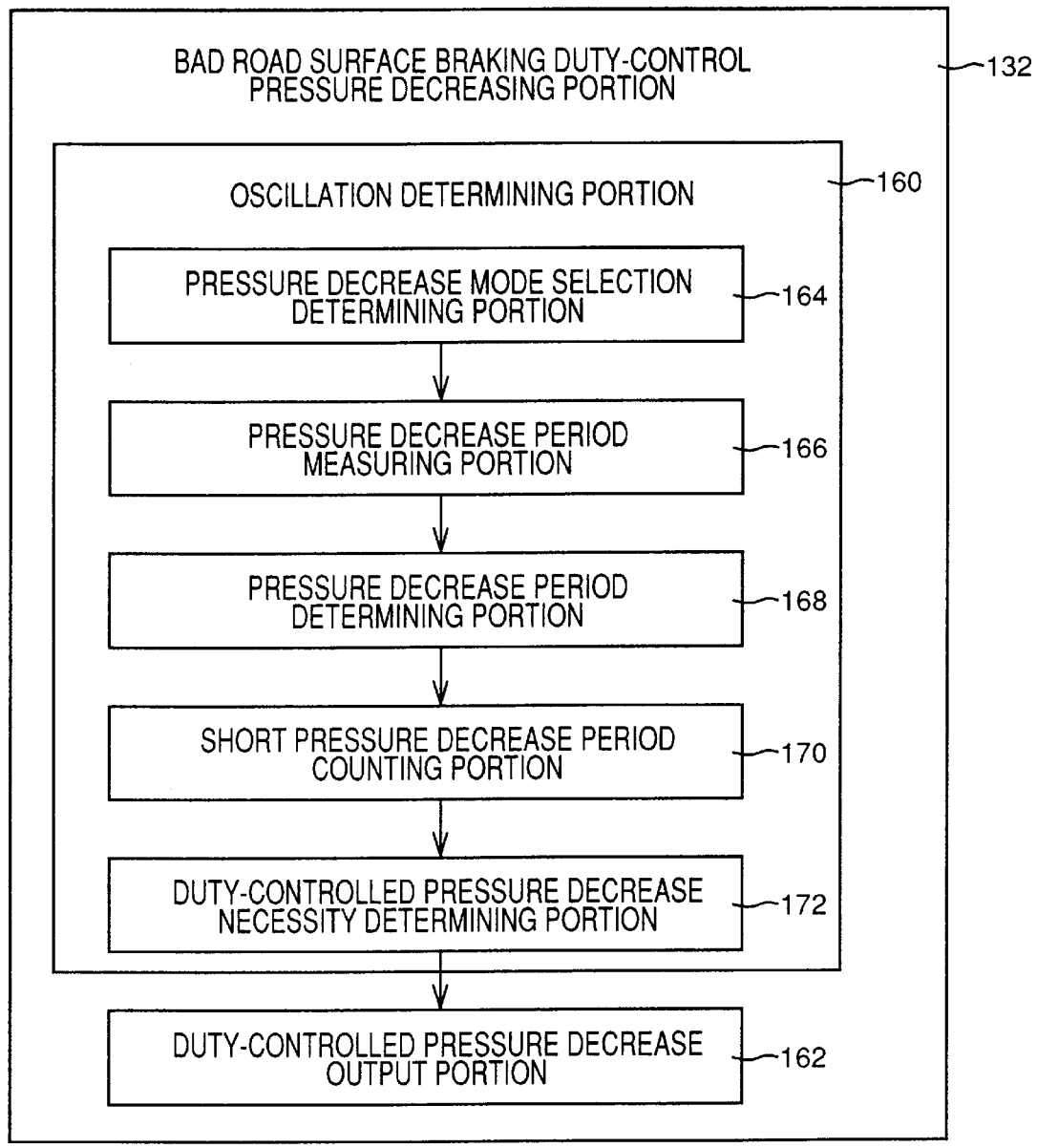
FIG. 22 is a block diagram indicating functional portions of the duty-control pressure decreasing portion 132.

To achieve the above function, the bad road surface braking duty-control pressure decreasing portion 132 includes an oscillation determining portion 160 and a duty-controlled pressure decrease output portion 162, as indicated in FIG. 22.

1) Oscillation Determining Portion 160

The oscillation determining portion 160 is adapted to determine whether the pressure decrease mode is frequently established in an oscillatory manner for each wheel brake cylinder, during an anti-lock braking pressure control operation. The oscillation determining portion 160 includes a pressure decrease mode selection determining portion 164, a pressure decrease period measuring portion 166, a pressure decrease period determining portion 168, a short pressure decrease period counting portion 170, and a duty-controlled pressure decrease necessity determining portion 172.

1-1) Pressure Decrease Mode Selection Determining Portion 164

The pressure decrease mode selection determining portion 164 is adapted to detect a moment at which the pressure decrease mode is selected or established. Described in detail, the selection of the pressure decrease mode is detected if the pressure control mode selected in the last control cycle is any one of the pressure control modes other than the pressure decrease mode and if the pressure control mode selected in the present control cycle is the pressure decrease mode. In the present embodiment, the pressure control modes other than the pressure decrease mode consist of the master cylinder increase mode, pump increase mode, slow pressure increase mode and pressure hold mode.

1-2) Pressure Decrease Period Measuring Portion 166

The pressure decrease period measuring portion 166 is adapted to measure a time interval between the moment at which the pressure decrease mode was selected or established previously and the moment at which the pressure decrease mode is currently selected or established. This time interval between the successive points of time at which the pressure decrease mode is selected is referred to as "pressure decrease period". Described more specifically by reference to FIG. 23, a pressure decrease period counter (provided in the RAM 66) is reset to an initial value when the pressure decrease mode is established for the first time, as indicated at RM1. This pressure decrease period counter is decremented at a predetermined time interval.

1-3) Pressure Decrease Period Determining Portion 168

This pressure decrease period determining portion 168 is adapted to determine whether the pressure decrease period is shorter than a predetermined threshold. Described more superficially by reference to FIG. 23, the pressure decrease period is determined to be shorter than the threshold if the pressure decrease time is established again before the pressure decrease period counter has been decremented to zero, as indicated at RM2 in FIG. 23. The initial value of the counter corresponds to the above-indicated predetermined threshold.

1-4) Short Pressure Decrease Period Counting Portion 170

This short pressure decrease period counting portion 170 is adapted to count the number of determinations that the pressure decrease period is shorter than the threshold. Described in detail, a determination counter (also provided in the RAM 66) is reset to "0" when the pressure decrease mode is established for the first time as indicated at RM1. This determination counter is incremented when the pressure decrease mode is established again as indicated at RM2 before the pressure decrease period counter has been decremented to zero. The determination counter is reset to "0" if the pressure decrease mode is established again after the pressure decrease period counter has been decremented to zero.

2-5) Duty-controlled Pressure Decrease Necessity Determining Portion 172

Figure 23:
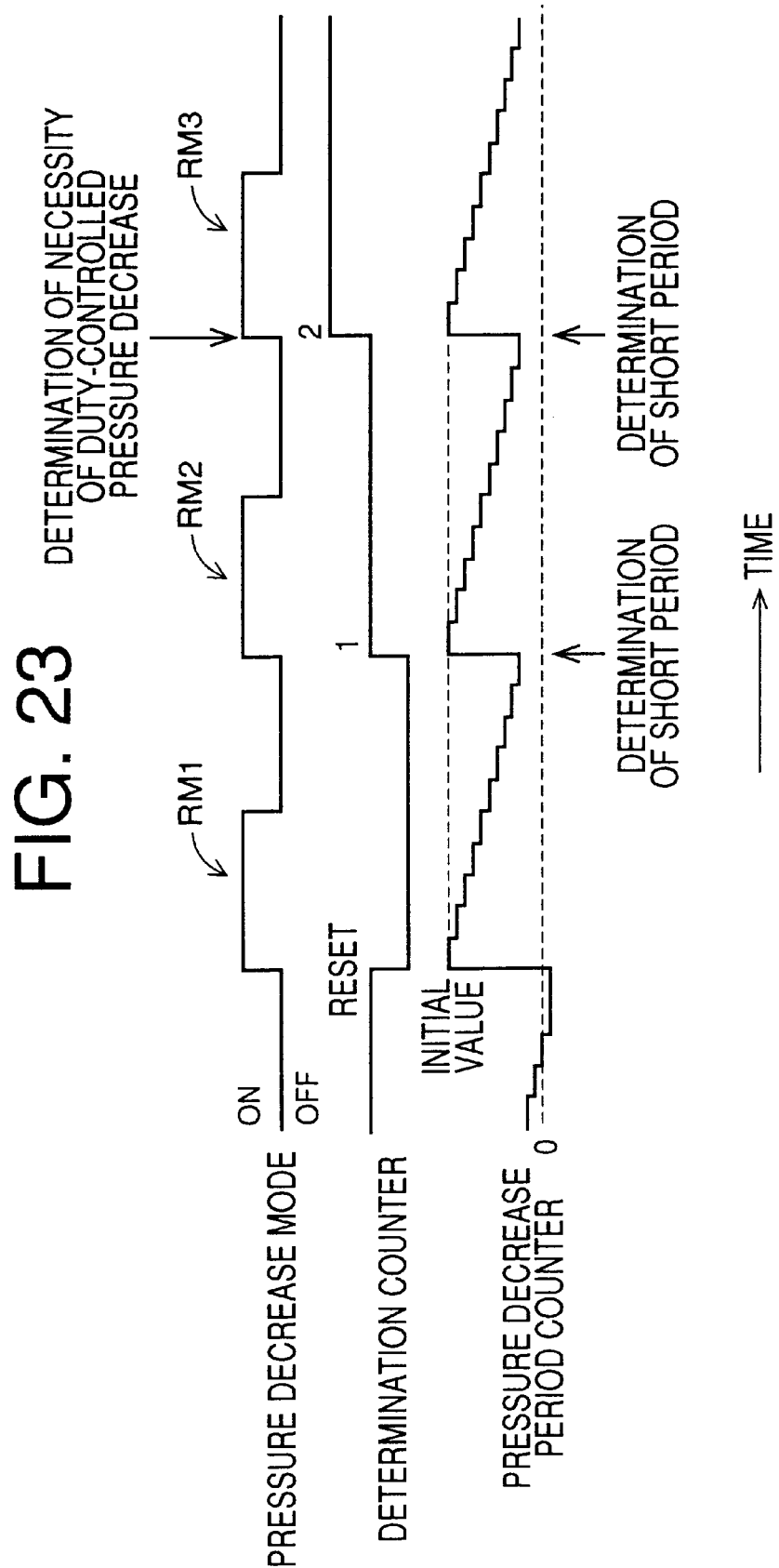
FIG. 23 is a graph for explaining an oscillation determining portion 160 shown in FIG. 22.

The duty-controlled pressure decrease necessity determining portion 172 is adapted to determine that the road surface condition is bad, when the count of the determination counter has exceeded a predetermined threshold N ("1" in the example of FIG. 23). An affirmative decision obtained by this determination indicates that the duty-controlled pressure decrease mode should be established. However, even if the threshold N is exceeded, the determining portion 172 determines that the duty-controlled pressure decrease mode need not be established, if the pressure decrease period counter has been decremented to zero thereafter, since the pressure decrease period to be measured next is not shorter than the threshold, and the establishment of the duty-controlled pressure decrease mode is no longer necessary.

2) Duty-controlled Pressure Decrease Output Portion 162

This duty-controlled pressure decrease output portion 162 is adapted to duty-control (alternately open and close) the third solenoid-operated shut-off valve device 38 when the duty-controlled pressured decrease necessity determining portion 172 determines the necessity of establishing the duty-controlled pressure decrease mode for the wheel brake cylinder in question.

Figure 24:
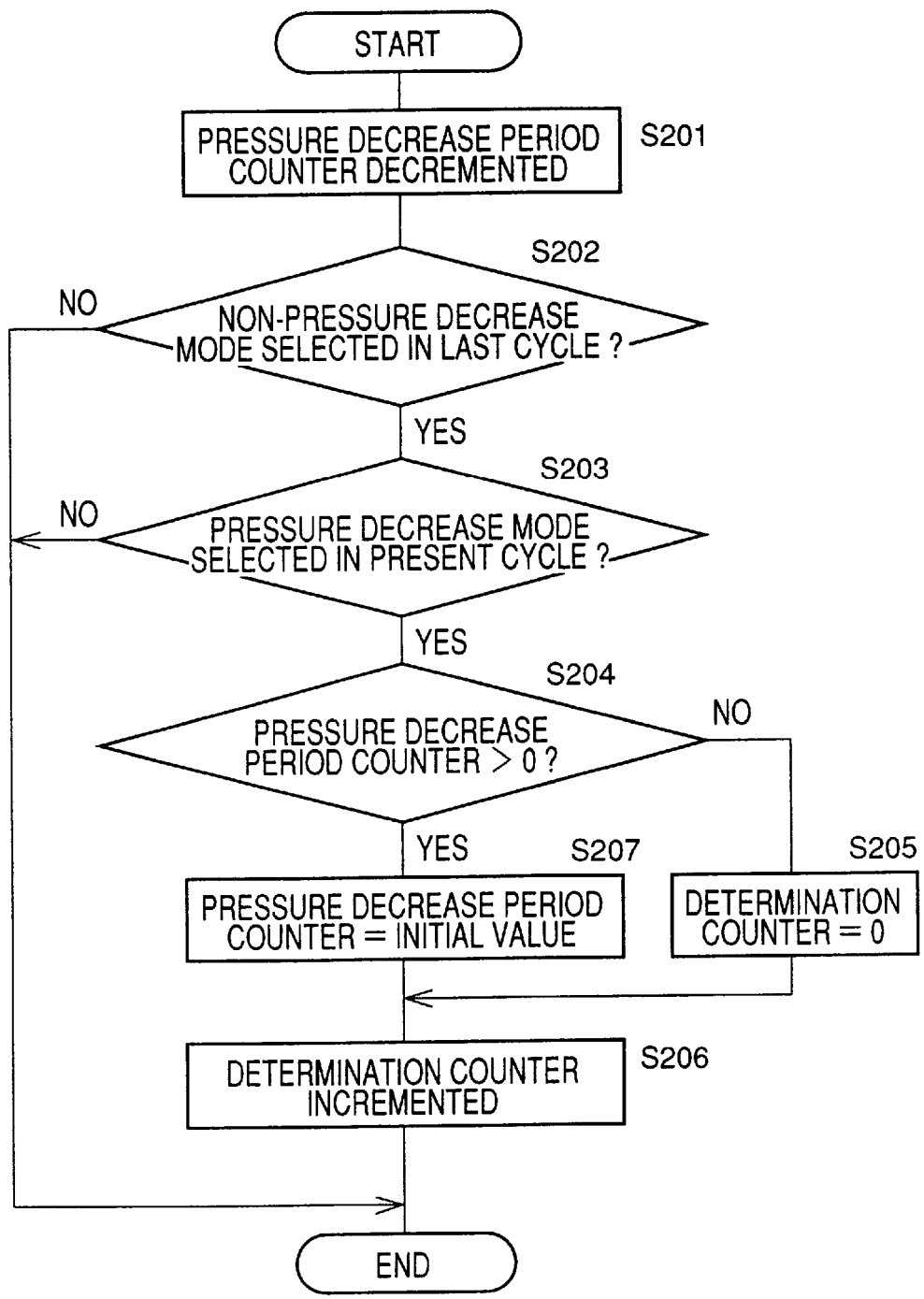
FIG. 24 is a flow chart illustrating a pressure decrease oscillation determining routine executed by the oscillation determining portion 160.
Figure 25:
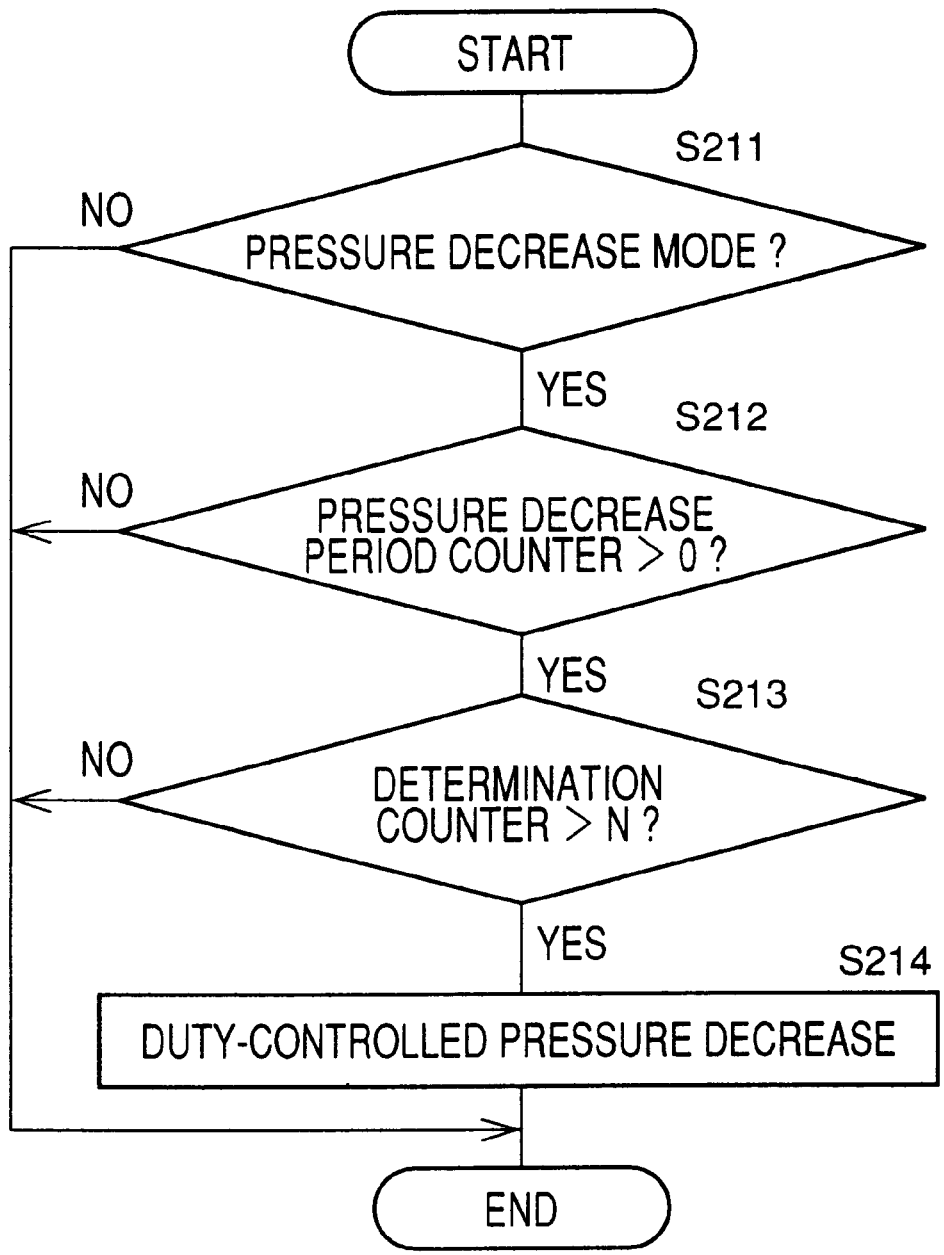
FIG. 25 is a flow chart illustrating a duty-controlled pressure decrease routine executed by a duty-controlled pressure decrease output portion 162 shown in FIG. 22.

The function of the oscillation determining portion 160 of the bad road surface duty-controlled pressure decreasing portion 132 is performed by execution by the computer 68 of a routine illustrated in the flow chart of FIG. 24, while the function of the duty-controlled pressure decrease output portion 162 is performed by execution by the computer 68 of a routine illustrated in the flow chart of FIG. 25. These routines of FIGS. 24 and 25 will be described.

The routine of FIG. 24, which is executed with a predetermined cycle time, is initiated with step S201 in which the pressure decrease period counter is decremented. The count of this counter may be equal to the initially set value, a value smaller than the initial value and larger than zero, or zero.

Step S201 is followed by step S202 to determine whether the pressure control mode established or selected in the last control cycle is any one of the pressure control modes other than the pressure decrease mode. If a negative decision (NO) is obtained in step S202, one cycle of execution of the routine of FIG. 24 is terminated. If an affirmative decision (YES) is obtained in step S202, the control flow goes to step S203 to determine whether the pressure control mode established or selected in the present control cycle is the pressure control mode.

If a negative decision (NO) is obtained in step S203, one cycle of execution of the routine is terminated. If an affirmative decision (YES) is obtained in step S203, the control flow goes to step S204 to determine whether the count of the pressure decrease period counter is larger than zero, that is, to determine whether the time period between the moments of two successive selections of the pressure decrease mode in the present and last control cycles is shorter than the predetermined threshold. If a negative decision (NO) is obtained in step S204, the control flow goes to step S205 to reset the determination counter to "0", and then goes to step S206 to reset the pressure decrease period counter to the initial value, for preparation for measuring the next pressure decrease period. One cycle of execution of the routine of FIG. 24 is completed with step S206.

If the affirmative decision (YES) is obtained in step S203, the negative decision (NO) is obtained in step S202 in the next cycle of execution of the routine of FIG. 24, since the pressure decrease mode was selected in the last control cycle. In this case, the present cycle of execution of the routine is terminated. If the pressure decrease mode once established is cancelled, and the pressure decrease mode is again selected and established during repeated execution of the routine, the affirmative decision (YES) is obtained in both steps S202 and S203, and the control flow goes to step S204 to determine whether the count of the pressure decrease period counter is larger than zero. If an affirmative decision (YES) is obtained in step S204, it means that the pressure decrease period is larger than the threshold. In this case, the determination counter is incremented. Then, step S206 is implemented to reset the pressure decrease period counter to "0", and one cycle execution of the routine is terminated.

If the pressure decrease mode has not been again selected in the next cycle of execution of the routine, the negative decision (NO) is obtained in step S202. If the pressure decrease mode has been again selected in the next cycle, the affirmative decision (YES) is obtained in steps S202 and S203, whereby step S204 is implemented. If the affirmative decision (YES) is again obtained in step S204, the determination counter is again incremented, so that the count of the determination counter is increased to "2". Then, step S206 is implemented to reset the pressure decrease period counter to the initial value, and the present cycle of execution of the routine is terminated.

Thus, the determination counter is incremented each that the pressure decrease period between successive moments of selection of the pressure decrease mode is shorter than the predetermined threshold. If the pressure decrease period is determined to be longer than the threshold, the determination counter is reset to "0". In this manner, the determination of the pressure decrease period and the counting of the number of determinations that the pressure decrease period is shorter than the threshold are repeated.

The routine of FIG. 25, which is also executed with a predetermined cycle time, is initiated with step S211 to determine whether the pressure decrease mode is selected in the present control cycle. If a negative decision (NO) is obtained in step S211, one cycle execution of the routine of FIG. 25 is terminated. If an affirmative decision (YES) is obtained in step S211, the control flow goes to step S212 to determine whether the count of the pressure decrease period counter is larger than zero. If a negative decision (NO) is obtained in step S212, one cycle of execution of the routine is terminated, without steps S213 and S214 being implemented. In this case, the duty-controlled pressure decrease mode is not established, and the braking pressure in the wheel brake cylinder in question is decreased in the normal pressure decrease mode.

If an affirmative decision (YES) is obtained in step S212, on the other hand, the control flow goes to step S213 to determine whether the count of the determination counter is larger than the predetermined threshold value N. If a negative decision (NO) is obtained in step S213, one cycle of execution of the routine is terminated without step S214 being implemented. In this case, too, the braking pressure is decreased in the normal pressure decrease mode.

If the affirmative decision (YES) is obtained in steps S212 and S213, the control flow goes to step S214 in which the duty-controlled pressure decrease mode is established for the wheel brake cylinder whose braking pressure has been decreased in the normal pressure decrease mode in an oscillatory fashion. Accordingly, the braking pressure in this wheel brake cylinder is decreased at a lower rate in the duty-controlled pressure decrease mode, than in the normal pressure decrease mode, so that the pressure decrease period is elongated so as to prevent frequent or oscillatory pressure decrease operations for the wheel brake cylinder in question, for thereby avoiding or minimizing reduction in the wheel braking force.

It will be understood that a portion of the computer 68 assigned to implement steps S202 and S203 constitutes the pressure decrease mode selection determining portion 164, while a portion of the computer 68 assigned to implement steps S201 and S206 cooperates with the pressure decrease period counter to constitute the pressure decrease period measuring portion 166. It will also be understood that a portion of the computer 68 assigned to implement steps S204 constitutes the duty-controlled pressure decrease period determining portion 168, and a portion of the computer 68 assigned to implement steps S205 and S207 cooperates with the determination counter to constitute the short pressure decrease period counting portion 170. It will further be understood that a portion of the computer 68 assigned to implement steps S211, S212 and S213 constitutes the duty-controlled pressure decrease necessity determining portion 172, while a portion of the computer 68 assigned to implement to step S214 constitute the duty-controlled pressured decrease output portion 162.

There will be described another embodiment of the present invention. Since this second embodiment is identical with the preceding embodiment, except for the pseudo pressure hold control routine, only the pseudo pressure hold control will be described.

In the first embodiment, the control state No. 6 of the solenoid-operated shut-off valve devices 30, 32, 38 is established where the pressure hold mode is selected for the front wheel brake cylinder while the pump increase mode is selected for the rear wheel brake cylinder, as indicated in FIGS. 7 and 8. In the control state No. 6, the first and third shut-off valve devices 30, 38 are closed while the second shut-off valve device 32 is open.

In the present braking system shown in FIG. 1, the pressure reducing device 52 is provided between the pump 42 and the front wheel brake cylinder 22. The first check valve 54 of the device 52 is not opened, namely, is held closed unless the delivery pressure of the pump 42 is higher than the pressure in the front wheel brake cylinder 22 by an amount larger than the present valve opening pressure difference. Therefore, the fluid flow from the pump 42 to the front wheel brake cylinder 22 is inhibited, and the pressure in this cylinder 22 is held constant, unless the pressure difference across the first check valve 54 is smaller than the present valve opening pressure difference. When the delivery pressure of the pump 42 becomes higher than the pressure in the front wheel brake cylinder 22 by more than the valve opening pressure difference, the check valve 54 is opened, and the fluid pressurized by the pump 42 is permitted to flow through the check valve 54 toward the front wheel brake cylinder 22. At this time, the fluid from the pump 42 is distributed to the front wheel brake cylinder 22 and the rear wheel brake cylinder 26. Since the volume of the rear wheel brake cylinder 26 is usually smaller than that of the front wheel brake cylinder 22, the braking pressure in the rear wheel brake cylinder 26 is relatively rapidly increased while that in the front wheel brake cylinder 22 is relatively lowly increased. Thus, the braking pressure in the front wheel brake cylinder 22 is increased although this front wheel braking pressure should be held constant.

In the first embodiment, therefore, the selection of the pressure increase mode for the rear wheel brake cylinder 26 will cause the braking pressure in the front wheel brake cylinder 22 to be actually increased even though the pressure hold mode is selected for the front wheel brake cylinder.

Figure 26:
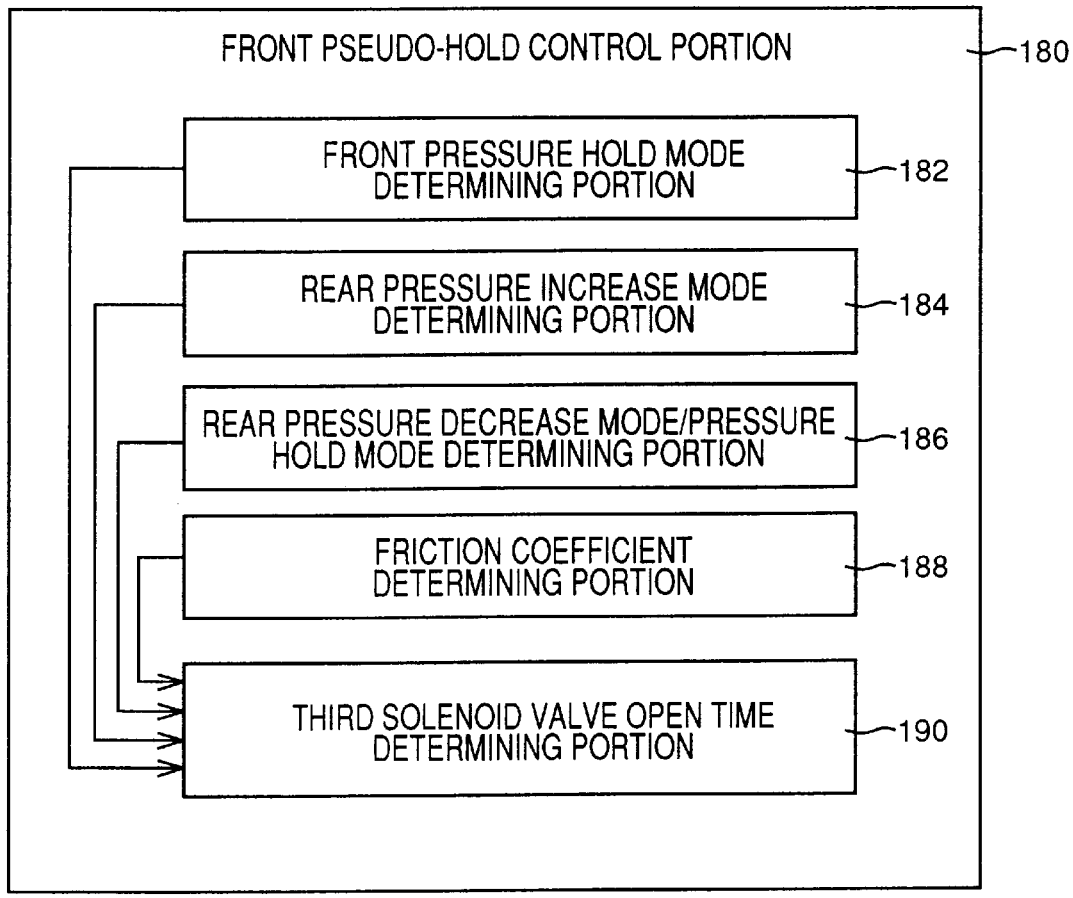
FIG. 26 is a block diagram indicating functional portions of a front Pseudo-Hold control portion 180 provided in another embodiment of this invention.

In the present second embodiment arranged in view of the above fact, the front Pseudo-Hold control portion 108 and the front and rear Pseudo-Hold control portion 110 of the solenoid valve control portion 106 are replaced by a front Pseudo-Hold control portion 180. As shown in FIG. 26, this front Pseudo-Hold control portion 180 includes a front pressure hold mode determining portion 182, a rear pressure increase mode determining portion 184, a rear pressure decrease mode/pressure hold mode determining portion 186, a friction coefficient determining portion 188, and a third solenoid valve open time determining portion 190.

The front Pseudo-Hold control portion 180 is adapted to establish the pseudo-hold mode for the front wheel brake cylinder, irrespective of the pressure control mode selected for the rear wheel brake cylinder, when the pressure hold mode is selected for the front wheel brake cylinder.

However, the front Pseudo-Hold control portion 180 is adapted such that the duty ratio or cycle of the third shut-off valve device 38 is changed depending upon the pressure control mode selected for the rear wheel brake cylinder. The duty ratio is determined by an open time $t_O$ and a close time $t_c$ during which the shut-off valve device 38 is held open and closed, respectively. Described in detail, the open time $t_O$ of the shut-off valve 38 when the pressure decrease or hold mode is selected for the rear wheel brake cylinder is made longer than when the pressure increase mode is selected for the rear wheel brake cylinder. When the pressure decrease or hold mode is selected for the rear wheel brake cylinder, the open time $t_O$ is determined to be longer than the close time $t_c$. When the pressure increase mode is selected for the rear wheel brake cylinder, the open time $t_O$ is determined to be shorter than the close time $t_c$.

Figure 27A:
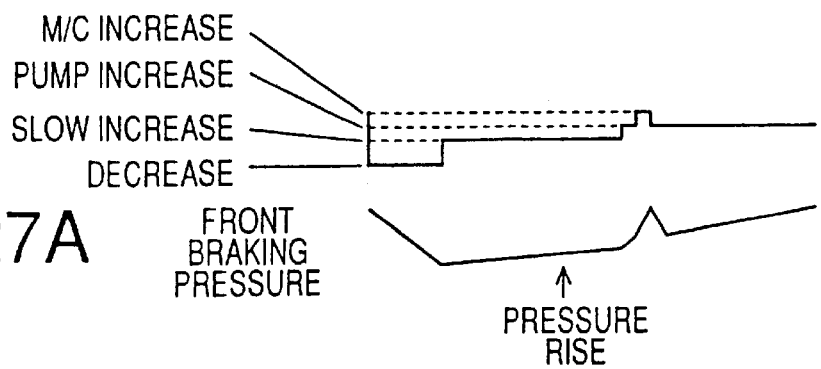
FIGS. 27A, 27B and 27C are graphs for explaining the function of the control portion 180.
Figure 27B:
Figure 27C:
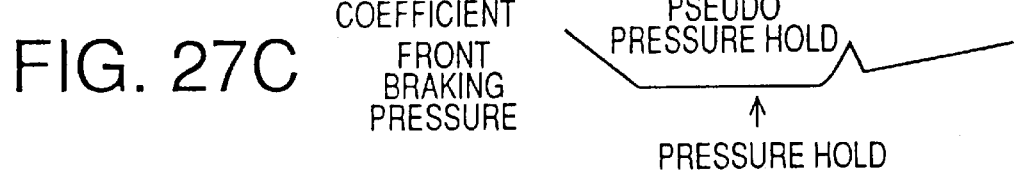

The front Pseudo-Hold control portion 180 is further adapted to change the open time $t_0$ of the shut-off valve device 38 according to a change in the friction coefficient $\mu$ of the road surface, so that the braking pressure in the front wheel brake cylinder is compensated for the change in the friction coefficient during an anti-lock braking pressure control operation. Namely, the open time $t_0$ is made longer when the friction coefficient $\mu$ is relatively low than when it is relatively high, as shown in FIGS. 27B and 27C

The front Pseudo-Hold control portion 180 determines the open time $t_0$ in the following manner:
1) Where the Pressure Increase Mode is Selected for the Rear Wheel Brake Cylinder In this case, the open time $t_{01}$, when the friction coefficient $\mu$ is relatively high is determined to be shorter than the open time $t_{02}$ when the friction coefficient $\mu$ is relatively low. That is, the open time $t_0$ is determined so as to satisfy an inequality, $t_{01} < t_{02}$.
2) Where the Pressure Decrease or Hold Mode is Selected for the Rear Wheel Brake Cylinder In this case, the open time $t_{03}$ when the friction coefficient $\mu$ is relatively high is determined to be shorter than the open time $t_{04}$ when the friction coefficient $\mu$ is relatively low. That is, the open time $t_0$ is determined so as to satisfy an inequality, $t_{03} < t_{04}$.

The front Pseudo-Hold control portion 180 is further adapted to determine the open times $t_{01}$, $t_{02}$, $t_{03}$ and $t_{04}$ so as to satisfy an inequality, $t_{01} < t_{02} < t_{03} < t_{04}$.

However, the open time $t_0$ may be determined so as to satisfy the following formula or inequality:

$$t_{01} < t_{02} = t_{03} < t_{04}$$

$$t_{01} < t_{03} < t_{02} < t_{04}$$

Figure 28:
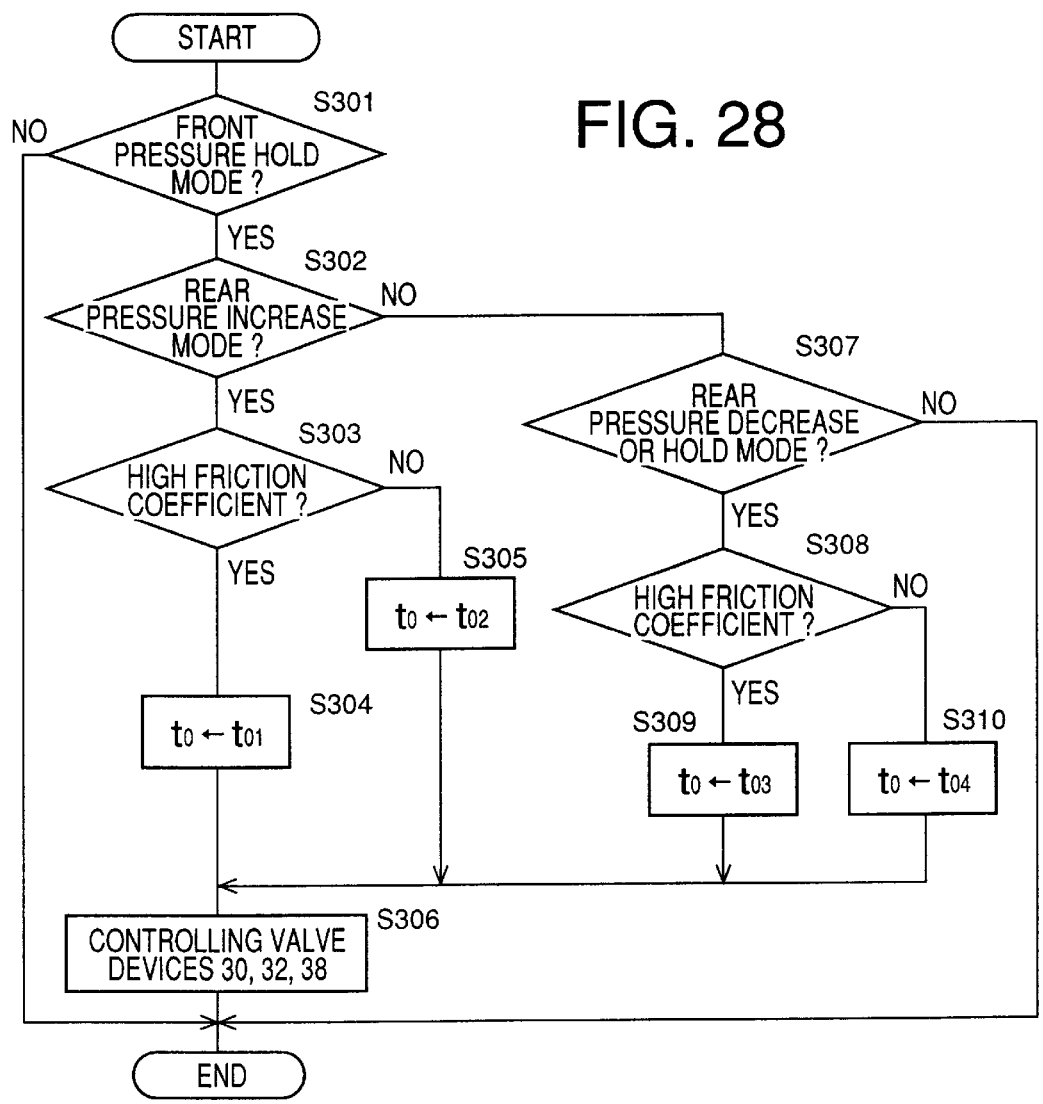
FIG. 28 is a flow chart illustrating a routine executed by the control portion 180.
Figure 29:
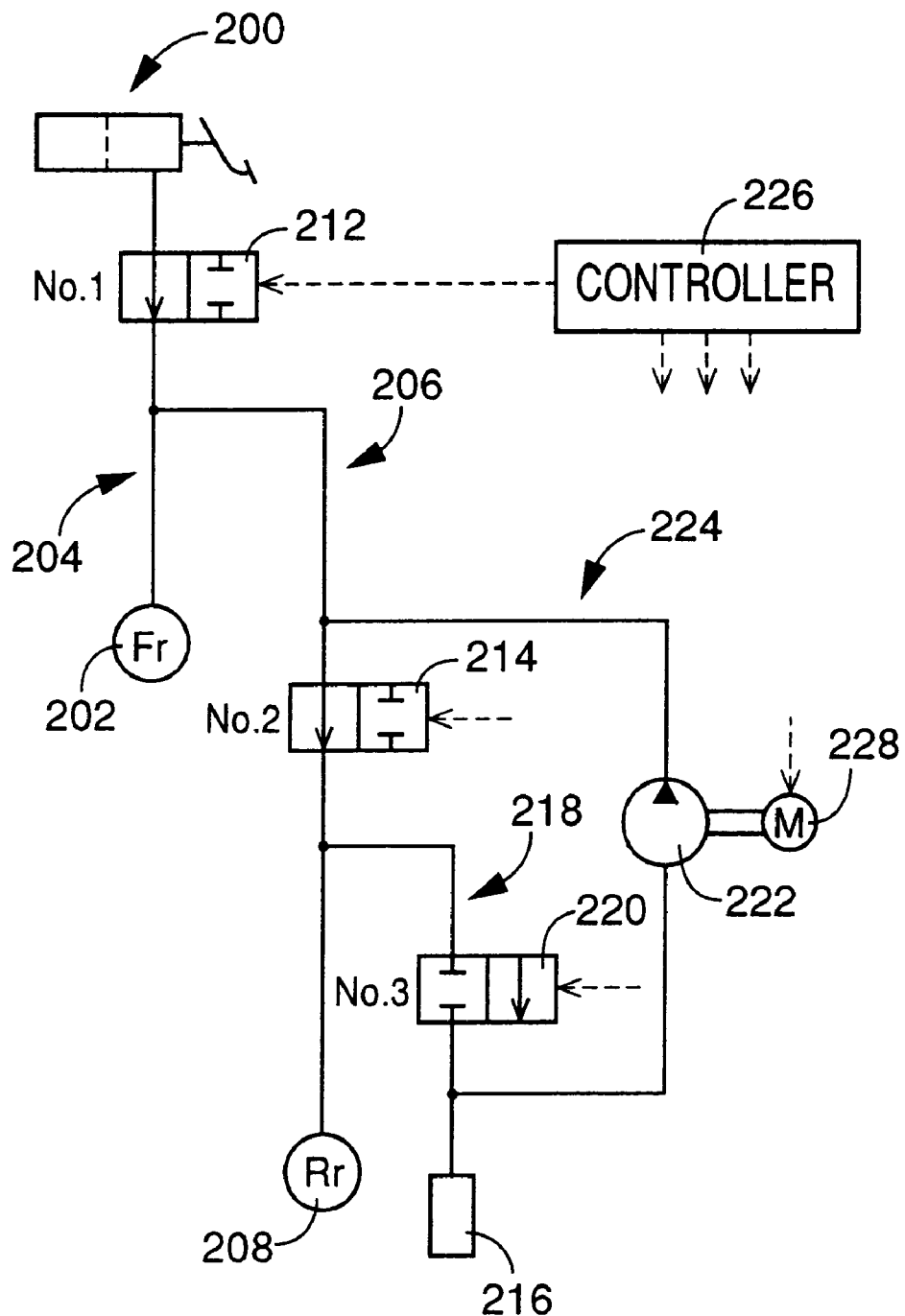
FIG. 29 is a schematic view showing a braking system of diagonal type developed by the assignee of the present invention.

The function of the front Pseudo-Hold control portion 180 is performed by execution by the computer 68 of a front pseudo pressure hold control routine illustrated in the flow chart of FIG. 28, according to control program stored in the ROM 64.

The routine of FIG. 28, which is executed with a predetermined cycle time, is initiated with step S301 to determine whether the pressure hold mode is selected for the front wheel brake cylinder. If a negative decision (NO) is obtained in step S301, one cycle of execution of the routine is terminated. If an affirmative decision (YES) is obtained in step S301, the control flow goes to step S302 to determine whether the pressure increase mode is selected for the rear wheel brake cylinder.

If an affirmative decision (YES) is obtained in step S302, the control flow goes to step S303 to determine whether the friction coefficient $\mu$ of the road surface on which the vehicle is running is higher than a predetermined threshold. This determination is effected by determining whether the estimated deceleration value of the vehicle is higher than a predetermined threshold (e.g., 0.3G). If the road surface is a dry asphalt surface, for example, and has a friction coefficient $\mu$ higher than the threshold, an affirmative decision (YES) is obtained in step S303. In this case, the control flow goes to step S304 in which the open time $t_0$ of the third shut-off valve device 38 is determined to be equal to the value $t_{01}$ described above. If the road surface is covered by compressed snow or frozen, for example, and has a friction coefficient $\mu$ lower than the threshold, a negative decision (NO) is obtained in step S303. In this case, the control flow goes to step S305 in which the open time $t_0$ is determined to be equal to the value $t_{02}$, which is larger than the value $t_{01}$.

Steps S304 and S305 are followed by step S306 in which the appropriate drive signals are applied to the first, second and third shut-off valve devices 30, 32, 38. Described more specifically, the second shut-off valve device 32 is duty-controlled with a predetermined open time $t_0$ and the third shut-off valve device 38 is duty-controlled with the open time $t_0$ determined as described above, while the first shut-off valve device 30 is held closed. Thus, one cycle of execution of the routine of FIG. 28 is terminated.

If the pressure decrease or hold mode is selected for the rear wheel brake cylinder, a negative decision (NO) is obtained in step S302, and the control flow goes to step S307 to determine whether the pressure decrease or hold mode is selected for the rear wheel brake cylinder. Since an affirmative decision (YES) is obtained in step S307, the control flow goes to step S308 to determine whether the friction coefficient $\mu$ of the road surface is higher than the threshold. If an affirmative decision (YES) is obtained in step S308, the control flow goes to step S309 in which the open time $t_0$ of the third shut-off valve 38 is determined to the equal to the value $t_{03}$ described above. If a negative decision (NO) is obtained in step S308, the control flow goes to step S310 in which the the open time $t_0$ of the third shut-off valve 38 is determined to the equal to the value $t_{04}$ described above. Steps S309 and S310 are followed by step S306 described above.

It will be understood that portions of the computer 68 assigned to implement steps S301, S302 S307 constitute the front Pseudo-Hold control portion 182, the rear pressure increase mode determining portion 184 and the rear pressure decrease mode/pressure hold mode determining portion 186, respectively. It will also be understood that a portion of the computer 68 assigned to implement steps S202 and S308 constitutes the friction coefficient determining portion 188, while a portion of the computer 68 assigned to implement steps S304, S305, S309 and S310 constitutes the third solenoid valve open time determining portion 190.

In the present second embodiment, the front Pseudo-Hold control portion 180 functions as the solenoid valve control means and the front pseudo-hold means, while the friction coefficient determining portion 188 and the third solenoid valve open time determining portion 190 function as first open time changing means for determining the open time $t_0$ of the third solenoid-operated shut-off valve device 38, depending upon the pressure control mode selected for the rear wheel brake cylinder, and second open time changing means for determining the open time $t_0$ depending upon the friction coefficient of the road surface.

It is to be understood that while the braking system according to the illustrated embodiments is adapted to control the braking pressure in the brake cylinder for each of the wheels of a motor vehicle during anti-lock braking operation, the principle of this invention may be practiced to control the braking pressure for each of the drive wheels, for example, each of the front right and left drive wheels of the vehicle, for controlling traction forces or drive torques of the front drive wheels so as to prevent excessive amounts of slip of the drive wheels, during starting of the vehicle, in particular.

In the above case, the braking system is adapted such that if the drive torque of the front wheel is excessively large with respect to the friction coefficient $\mu$ of the road surface, with a result of an excessive amount of slip of the front wheel, the first and second shut-off valve devices 30, 32 are closed, and the pump 42 is operated to increase the braking pressure in the front wheel brake cylinder 22, for thereby preventing an excessive drive torque of the front drive wheel. When the braking pressure of the front wheel brake cylinder 22 is excessively increased by the pump 42, the second and third shut-off valves 32, 38 are opened, to reduce the braking pressure in the front wheel brake cylinder 22. In this case, the braking pressure in the front wheel brake cylinder 22 may be slowly decreased, by alternately opening and closing the third shut-off valve device 38. The rate of decrease in the braking pressure in the front wheel brake cylinder can be adjusted by changing the duty ratio or open time of the shut-off valve device 38.

It will be understood that the present invention may be embodied with various other changes, modifications and improvements, which may occur to those skilled in the art, without departing from the spirit and scope of the invention defined in the following claims:

What is claimed is:

1. A braking system of diagonal type of a motor vehicle having front right and left wheels and rear right and left wheels, said braking system having two pressure application sub-systems connected to respective two mutually independent pressurizing chambers of a master cylinder, one of said two sub-systems including a front right wheel brake cylinder for braking said front right wheel and a rear left wheel brake cylinder for braking said rear left wheel, while the other of said two sub-systems including a front left wheel brake cylinder for braking said front left wheel and a rear right wheel brake cylinder for braking said rear right wheel, each of said two sub-systems further including a front brake cylinder passage connecting said master cylinder and said front wheel brake cylinder, a rear brake cylinder passage connecting said front brake cylinder passage and said rear wheel brake cylinder, a first solenoid-operated valve device disposed in a portion of said front brake cylinder passage between said master cylinder and a point of connection between said front and rear brake cylinder passages, a second solenoid-operated valve device disposed in said rear brake cylinder passage and having an open and a closes state, a reservoir passage connected at one end thereto to a portion of said rear brake cylinder passage between said second solenoid-operated valve device and said rear wheel brake cylinder, a reservoir connected to the other end of said reservoir passage, a third solenoid-operated valve device disposed in said reservoir passage and having an open and a closed state, a pump passage connected at one end thereto to said reservoir and at the other end to a portion of said front brake cylinder passage between said first solenoid-operated valve device and said front wheel brake cylinder or a portion of said rear brake cylinder passage between said second solenoid-operated valve device and said point of connection, and a pump disposed in said pump passage, for pressurizing a fluid received from said reservoir, wherein an improvement comprises:

a controller for controlling said first, second and third solenoid-operated valve devices and said pump of said each sub-system, to control a braking pressure in each of the front and rear wheel brake cylinders of said each sub-system, said controller including solenoid valve control means for alternately placing said third solenoid-operated valve device in said open and closed states in a predetermined switching pattern while at the same time holding said second solenoid-operated valve device in said open state or alternately placing said second solenoid-operated valve device in said open and closed states in a predetermined switching pattern;

wherein said controller includes (a) control mode selecting means for selecting one of a plurality of pressure control modes for each of said front and rear wheel brake cylinders of said each sub-system, depending upon a slipping condition of said each wheel, said pressure control modes including a pressure decrease mode, a pressure increase mode and a pressure hold mode in which the braking pressure in the corresponding wheel brake cylinder is decreased, increased and held constant, respectively, and (b) solenoid valve opening and closing means for controlling said first second and third solenoid-operated valve devices according to the pressure control mode selected for said each wheel brake cylinder, said solenoid valve control means including a basic control portion for establishing the selected pressure control mode by holding each of said first, second and third solenoid-operated valve devices in a predetermined one of the open and closed states, and an auxiliary control portion for establishing said selected pressure control mode by alternately placing each of at least one of said first, second and third solenoid-operated valve devices in the open and closed states, said auxiliary control portion comprising said solenoid valve control means;

wherein said controller controls said first, second an third solenoid-operated valve devices so as to control the braking pressure in each of the wheel brake cylinders in an anti-lock fashion so as to prevent an excessive amount of slip of the corresponding wheel during braking of the motor vehicle, said solenoid valve control means comprising front pseudo-hold means for establishing a pseudo-hold mode for said front wheel brake cylinder when said pressure hold mode is selected by said control mode selecting means for said front wheel brake cylinder, irrespective of the pressure control mode selected for said rear wheel brake cylinder, said front pseudo-hold mode being established by alternately placing at least said third solenoid-operated valve device in said open and closed states, so that the braking pressure in said front wheel brake cylinders is held constant in said pseudo-hold mode.

2. A braking system according to claim 1, wherein said front pseudo-hold means comprises first open time determining means for determining a ratio of an open time during which said third solenoid-operated valve device is placed in said open state, to a close time during which said third solenoid-operated valve device is placed in said closed state, such that said ratio is higher when one of said pressure decrease and hold modes is selected by said control mode selecting means for said rear wheel brake cylinder than when said pressure increase mode is selected by said control mode selecting means for said rear wheel brake cylinder.

3. A braking system according to claim 1, wherein said front pseudo-hold means comprises second open time determining means for determining a ratio of an open time during which said third solenoid-operated valve device is placed in said open state, to a close time during which said third solenoid-operated valve device is placed in said closed state, such that said ratio is higher when a friction coefficient of a road surface on which the motor vehicle is running is relatively low than when said friction coefficient is relatively high.

4. A braking system of diagonal type of a motor vehicle having front right and left wheels and rear right and left wheels, said braking system having two pressure application sub-systems connected to respective two mutually independent pressurizing chambers of a master cylinder, one of said two sub-systems including a front right wheel brake cylinder for braking said front right wheel and a rear left wheel brake cylinder for braking said rear left wheel, while the other of said two sub-systems including a front left wheel brake cylinder for braking said front left wheel and a rear right wheel brake cylinder for braking said rear right wheel, each of said two sub-systems further including a front brake cylinder passage connecting said master cylinder and said front wheel brake cylinder, a rear brake cylinder passage connecting said front brake cylinder passage and said rear wheel brake cylinder, a first solenoid-operated valve device disposed in a portion of said front brake cylinder passage between said master cylinder and a point of connection between said front and rear brake cylinder passages, a second solenoid-operated valve device disposed in said rear brake cylinder passage and having an open and a closes state, a reservoir passage connected at one end thereto to a portion of said rear brake cylinder passage between said second solenoid-operated valve device and said rear wheel brake cylinder, a reservoir connected to the other end of said reservoir passage, a third solenoid-operated valve device disposed in said reservoir passage and having an open and a closed state, a pump passage connected at one end thereto to said reservoir and at the other end to a portion of said front brake cylinder passage between said first solenoid-operated valve device and said front wheel brake cylinder or a portion of said rear brake cylinder passage between said second solenoid-operated valve device and said point of connection, and a pump disposed in said pump passage, for pressurizing a fluid received from said reservoir, wherein an improvement comprises:

a controller for controlling said first, second and third solenoid-operated valve devices and said pump of said each sub-system, to control a braking pressure in each of the front and rear wheel brake cylinders of said each sub-system, said controller including solenoid valve control means for alternately placing said third solenoid-operated valve device in said open and closed states in a predetermined switching pattern while at the same time holding said second solenoid-operated valve device in said open state or alternately placing said second solenoid-operated valve device in said open and closed states in a predetermined switching pattern;

wherein said controller includes (a) control mode selecting means for selecting one of a plurality of pressure control modes for each of said front and rear wheel brake cylinders of said each sub-system, depending upon a slipping condition of said each wheel, said pressure control modes including a pressure decrease mode, a pressure increase mode and a pressure hold mode in which the braking pressure in the corresponding wheel brake cylinder is decreased, increased and held constant, respectively, and (b) solenoid valve opening and closing means for controlling said first second and third solenoid-operated valve devices according to the pressure control mode selected for said each wheel brake cylinder, said solenoid valve control means including a basic control portion for establishing the selected pressure control mode by holding each of said first, second and third solenoid-operated valve devices in a predetermined one of the open and closed states, and an auxiliary control portion for establishing said selected pressure control mode by alternately placing each of at least one of said first, second and third solenoid-operated valve devices in the open and closed states, said auxiliary control portion comprising said solenoid valve control means;

wherein said controller controls said first, second and third solenoid-operated valve devices so as to control the braking pressure in each of the wheel brake cylinders in an anti-lock fashion so as to prevent an excessive amount of slip of the corresponding wheel during braking of the motor vehicle, said solenoid valve control means comprising front pseudo-hold control means for establishing a pseudo-hold mode for said front wheel brake cylinder when said pressure hold mode and said pressure decrease modes are selected by said control mode selecting means for said front and rear wheel brake cylinders, respectively, said pseudo-hold mode being established by alternately placing at least said third solenoid-operated valve device in said open and closed states, so that the braking pressure in said front wheel brake cylinder is held-constant in said pseudo-hold mode.

5. A braking system according to claim 4, wherein said front pseudo-hold means alternately places said second solenoid-operated valve device in said open and closed states in a first predetermined switching pattern, and at the same time alternately places said third solenoid-operated valve device in said open and closed states in a second predetermined switching pattern wherein drive pulses for intermittently opening said third solenoid-operated valve device have a period which is equal to those for intermittently opening said second solenoid-operated valve device.

6. A braking system according to claim 5, wherein each of said first and second switching patterns is such that said period of said drive pulses is held constant while said second and third solenoid-operated valve devices are alternately placed in said open and closed states.

7. A braking system of diagonal type of a motor vehicle having front right and left wheels and rear right and left wheels, said braking system having two pressure application sub-systems connected to respective two mutually independent pressurizing chambers of a master cylinder, one of said two sub-systems including a front right wheel brake cylinder for braking said front right wheel and a rear left wheel brake cylinder for braking said rear left wheel, while the other of said two sub-systems including a front left wheel brake cylinder for braking said front left wheel and a rear right wheel brake cylinder for braking said rear right wheel, each of said two sub-systems further including a front brake cylinder passage connecting said master cylinder and said front wheel brake cylinder, a rear brake cylinder passage connecting said front brake cylinder passage and said rear wheel brake cylinder, a first solenoid-operated valve device disposed in a portion of said front brake cylinder passage between said master cylinder and a point of connection between said front and rear brake cylinder passages, a second solenoid-operated valve device disposed in said rear brake cylinder passage and having an open and a closes state, a reservoir passage connected at one end thereto to a portion of said rear brake cylinder passage between said second solenoid-operated valve device and said rear wheel brake cylinder, a reservoir connected to the other end of said reservoir passage, a third solenoid-operated valve device disposed in said reservoir passage and having an open and a closed state, a pump passage connected at one end thereto to said reservoir and at the other end to a portion of said front brake cylinder passage between said first solenoid-operated valve device and said front wheel brake cylinder or a portion of said rear brake cylinder passage between said second solenoid-operated valve device and said point of connection, and a pump disposed in said pump passage, for pressurizing a fluid received from said reservoir, wherein an improvement comprises:

a controller for controlling said first, second and third solenoid-operated valve devices and said pump of said each sub-system, to control a braking pressure in each of the front and rear wheel brake cylinders of said each sub-system, said controller including solenoid valve control means for alternately placing said third solenoid-operated valve device in said open and closed states in a predetermined switching pattern while at the same time holding said second solenoid-operated valve device in said open state or alternately placing said second solenoid-operated valve device in said open and closed states in a predetermined switching pattern;

wherein said controller includes (a) control mode selecting means for selecting one of a plurality of pressure control modes for each of said front and rear wheel brake cylinders of said each sub-system, depending upon a slipping condition of said each wheel, said pressure control modes including a pressure decrease mode, a pressure increase mode and a pressure hold mode in which the braking pressure in the corresponding wheel brake cylinder is decreased, increased and held constant, respectively, and (b) solenoid valve opening and closing means for controlling said first second and third solenoid-operated valve devices according to the pressure control mode selected for said each wheel brake cylinder, said solenoid valve control means including a basic control portion for establishing the selected pressure control mode by holding each of said first, second and third solenoid-operated valve devices in a predetermined one of the open and closed states, and an auxiliary control portion for establishing said selected pressure control mode by alternately placing each of at least one of said first, second and third solenoid-operated valve devices in the open and closed states, said auxiliary control portion comprising said solenoid valve control means;

wherein said controller controls said first, second and third solenoid-operated valve devices so as to control the braking pressure in each of the wheel brake cylinders in an anti-lock fashion so as to prevent an excessive amount of slip of the corresponding wheel during braking of the motor vehicle, said solenoid valve control means comprising front and rear pseudo-hold means for establishing a pseudo-hold mode for said front and rear wheel brake cylinders when said pressure hold mode is selected by said control mode selecting means for said front and rear wheel brake cylinders, said pseudo-hold mode being established by alternately placing at least said third solenoid-operated valve device in said open and closed states, so that the braking pressures in said front and rear wheel brake cylinders are held constant in said pseudo-hold mode.

8. A braking system according to claim 7, wherein said front and rear pseudo-hold means alternately places said second solenoid-operated valve device in said open and closed states in a first predetermined switching pattern, and at the same time alternately places said third solenoid-operated valve device in said open and closed states in a second predetermined switching pattern wherein an open time during which said third solenoid-operated valve device is placed in said open state is shorter than an open time during which said second solenoid-operated valve device is placed in said open state.

9. A braking system according to claim 8, wherein drive pulses for intermittently opening said third solenoid-operated valve device have a period which is two times that of drive pulses for intermittently opening said second solenoid-operated valve device.

10. A braking system of diagonal type of a motor vehicle having front right and left wheels and rear right and left wheels, said braking system having two pressure application sub-systems connected to respective two mutually independent pressurizing chambers of a master cylinder, one of said two sub-systems including a front right wheel brake cylinder for braking said front right wheel and a rear left wheel brake cylinder for braking said rear left wheel, while the other of said two sub-systems including a front left wheel brake cylinder for braking said front left wheel and a rear right wheel brake cylinder for braking said rear right wheel, each of said two sub-systems further including a front brake cylinder passage connecting said master cylinder and said front wheel brake cylinder, a rear brake cylinder passage connecting said front brake cylinder passage and said rear wheel brake cylinder, a first solenoid-operated valve device disposed in a portion of said front brake cylinder passage between said master cylinder and a point of connection between said front and rear brake cylinder passages, a second solenoid-operated valve device disposed in said rear brake cylinder passage and having an open and a closed state, a reservoir passage connected at one end thereto to a portion of said rear brake cylinder passage between said second solenoid-operated valve device and said rear wheel brake cylinder, a reservoir connected to the other end of said reservoir passage, a third solenoid-operated valve device disposed in said reservoir passage and having an open and a closed state, a pump passage connected at one end thereof to said reservoir and at the other end to one of (a) a portion of said front brake cylinder passage between said first solenoid-operated valve device and said front wheel brake cylinder and (b) a portion of said rear brake cylinder passage between said second solenoid-operated valve device and said point of connection, and a pump disposed in said pump passage, for pressurizing a fluid received from said reservoir, wherein an improvement comprises:

a controller for controlling said first, second and third solenoid-operated valve devices and said pump of said each sub-system, to control a braking pressure in each of the front and rear wheel brake cylinders of said each sub-system, so as to prevent an excessive amount of slip of the corresponding wheel, said controller including solenoid valve control means for alternately placing said third solenoid-operated valve device in said open and closed states while at the same time holding said second solenoid-operated valve device in said open state, if a time duration for which said second and third solenoid-operated valve devices are held in said open state exceeds a predetermined threshold.

11. A braking system according to claim 10, wherein said solenoid valve control means alternately places said third solenoid-operated valve device in said open and closed states while at the same time holding said second solenoid-operated valve device in said open state, if said time duration exceeds said predetermined threshold and if a friction coefficient of a road surface on which the motor vehicle is running is lower than a predetermined value, said solenoid valve control means holding said third solenoid-operated valve device in said closed state while at the same time holding said second solenoid-operated valve device in said open state, if said time duration exceeds said predetermined threshold and if said friction coefficient is not lower than said predetermined value.

* * * * *